US007966297B2

(12) United States Patent
Guilbert

(10) Patent No.: US 7,966,297 B2
(45) Date of Patent: Jun. 21, 2011

(54) APPLICATION INTEGRATION FRAMEWORK

(75) Inventor: Darren Michael Guilbert, Koolewong (AU)

(73) Assignee: Oracle International Corporation, Redwood Shores, CA (US)

( * ) Notice: Subject to any disclaimer, the term of this patent is extended or adjusted under 35 U.S.C. 154(b) by 580 days.

(21) Appl. No.: 12/041,464

(22) Filed: Mar. 3, 2008

(65) Prior Publication Data

US 2009/0222464 A1 Sep. 3, 2009

(51) Int. Cl.
*G06F 7/00* (2006.01)
*G06F 17/00* (2006.01)
(52) U.S. Cl. ........................................ 707/662
(58) Field of Classification Search ............ 707/999.1, 707/662
See application file for complete search history.

(56) References Cited

U.S. PATENT DOCUMENTS

| 2005/0038779 | A1 | 2/2005 | Fernandez et al. | |
|---|---|---|---|---|
| 2005/0096932 | A1 | 5/2005 | Fernandez et al. | |
| 2005/0171980 | A1 | 8/2005 | Fernandez et al. | |
| 2007/0214159 | A1* | 9/2007 | Lawson et al. ............ | 707/101 |

OTHER PUBLICATIONS

Krishna, N. PeopleSoft Integration White Paper, believed to be prior to Mar. 2008, pp. 7.

PeopleSoft Integration Broker, A Businessperson's Guide, PeopleSoft Technology Whitepaper, May 2003, pp. 11.
Oracle's PeopleSoft Student Administration Enrollment Services Datasheet, Oracle Corporation, Dec. 2006, pp. 11.
Oracle XML Gateway, User's Guide, Release 12, Part No. B31056-01, Dec. 2006, pp. 10.
PeopleTools 8.12 PeopleSoft Application Messaging PeopleBook, Chapter 3 and Chapter 7, 2001, pp. 3-1 to 3-11; 7-1 to 7-15.
Oracle Applications Integration Cookbook: A Developer's Guide, An Oracle White Paper, Chapter 4, Aug. 2005, pp. 32-95.

* cited by examiner

*Primary Examiner* — Mohammad Ali
*Assistant Examiner* — Alexey Shmatov
(74) *Attorney, Agent, or Firm* — Silicon Valley Patent Group LLP; Omkar Suryadevara

(57) ABSTRACT

A computer receives records to be published to a target application, including at least one record identified as not effective until a specified date in future. The target application is unable to delay processing of the identified record(s) until after the specified date. Hence, the computer is programmed, e.g. by a software developer extending predefined classes, to initially prepare and transmit to the target application, an outgoing message based on records that are not future dated, while omitting a new record to be effective in future. The computer stores the omitted data in a store of data to be published in future. The computer is pre-programmed to automatically respond to a date for data in the store becoming current, by preparing and transmitting a new version of the outgoing message, based on to-be-published data from the store, and based on a current version of previously published data if needed.

26 Claims, 19 Drawing Sheets

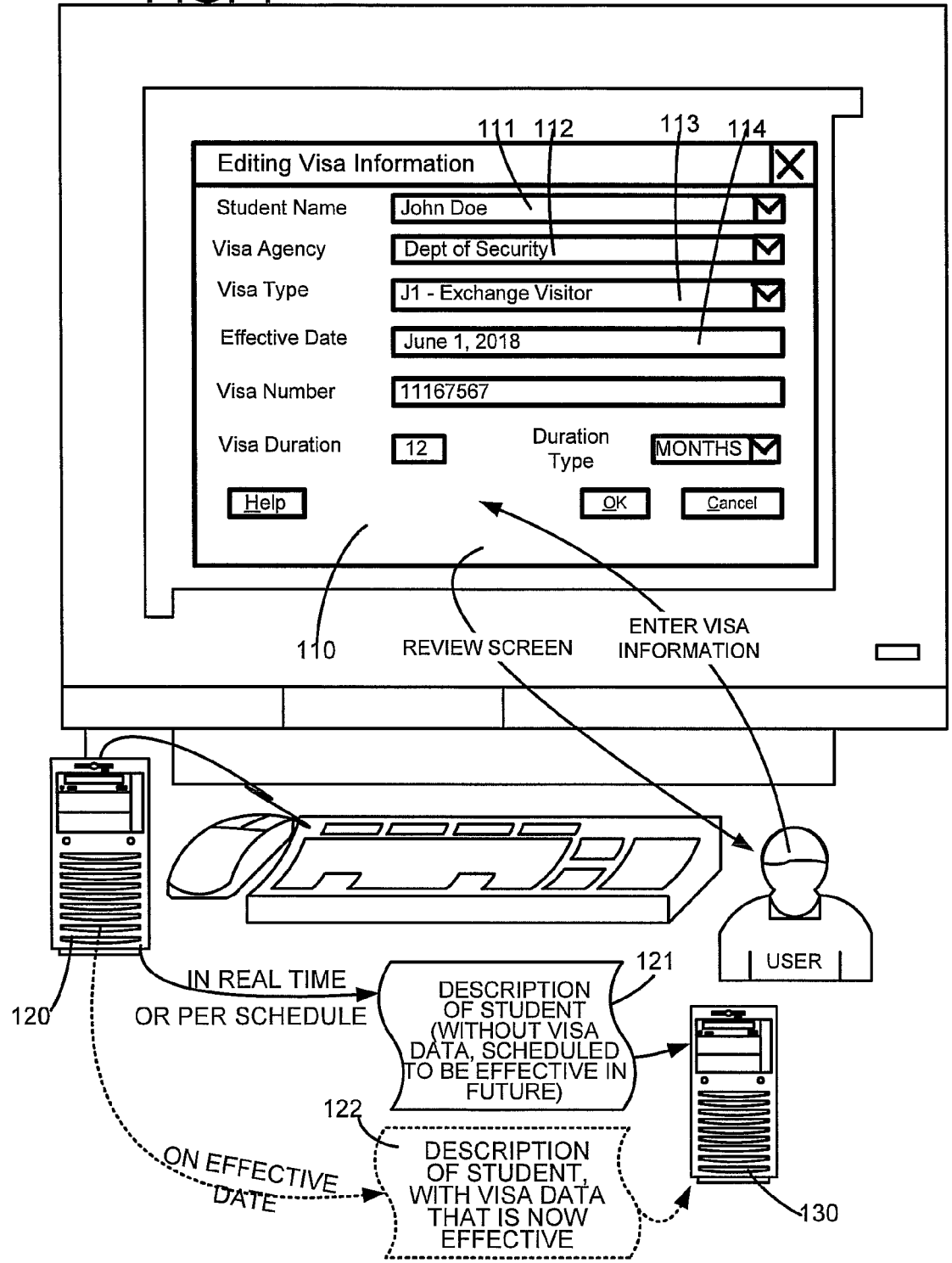

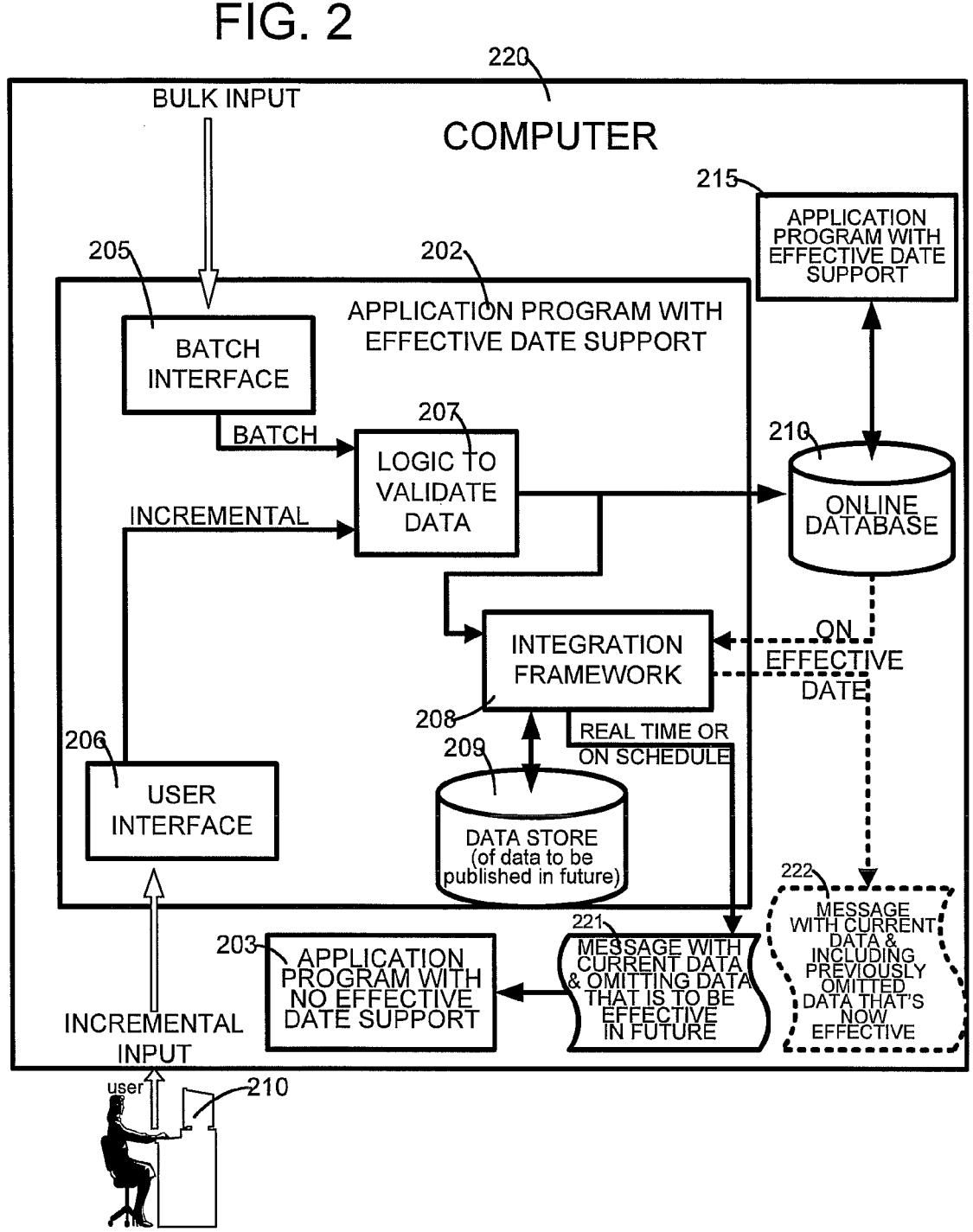

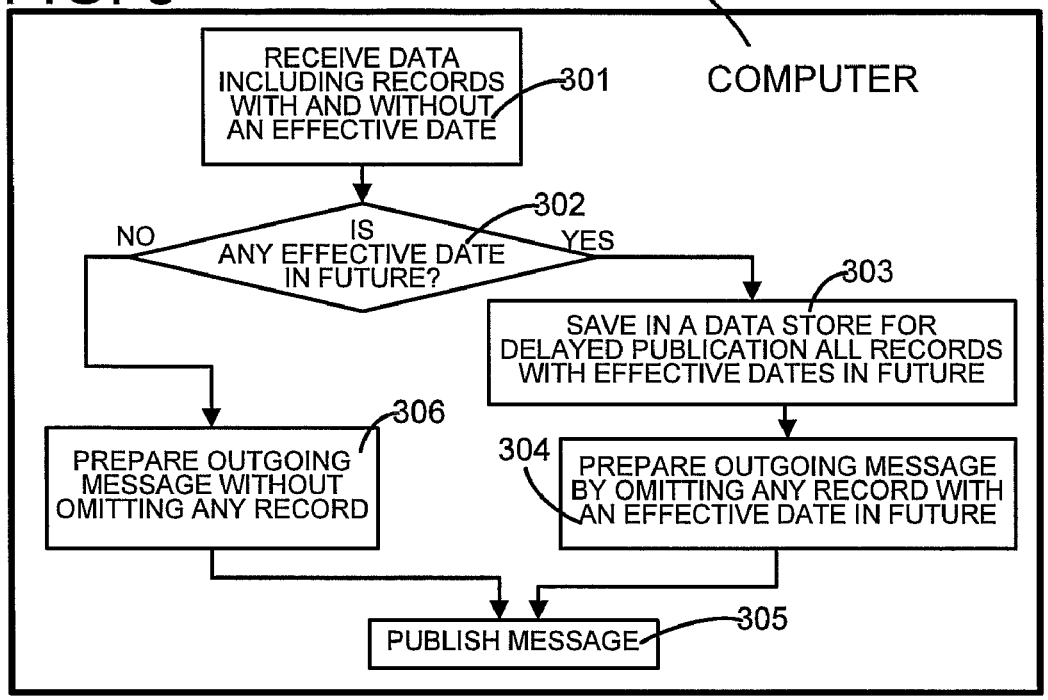
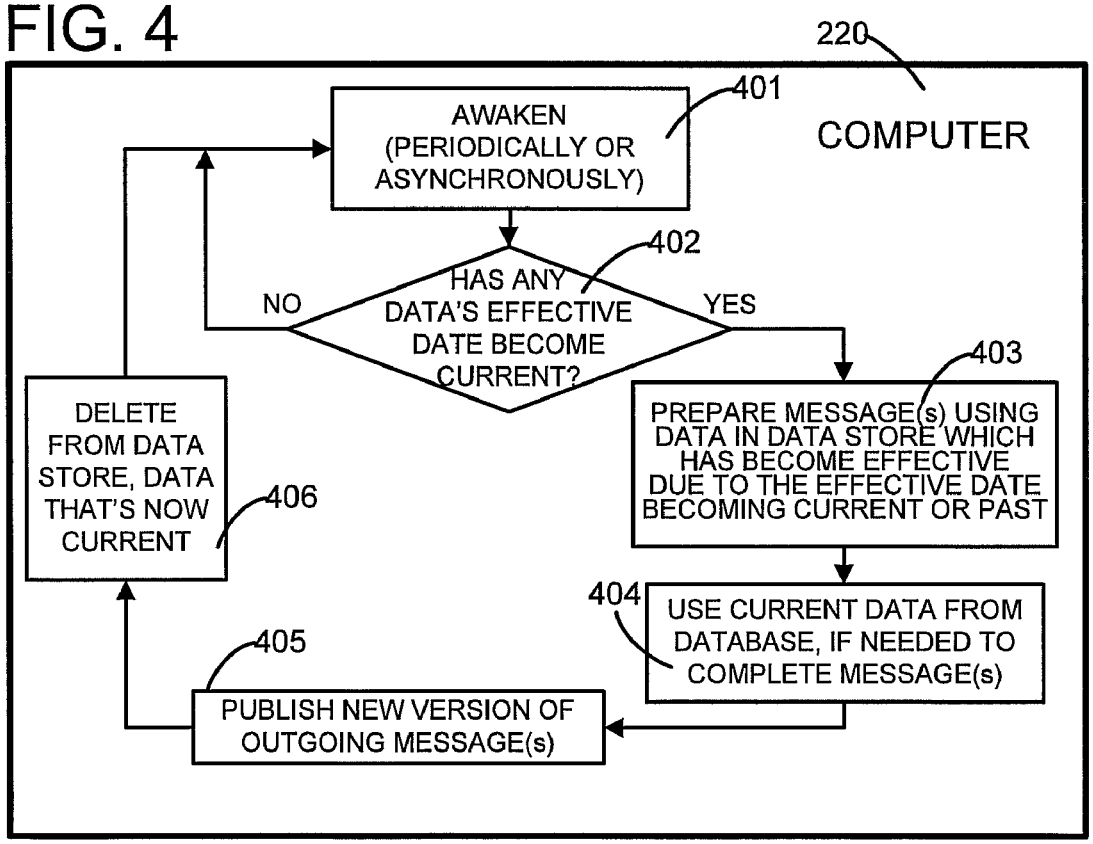

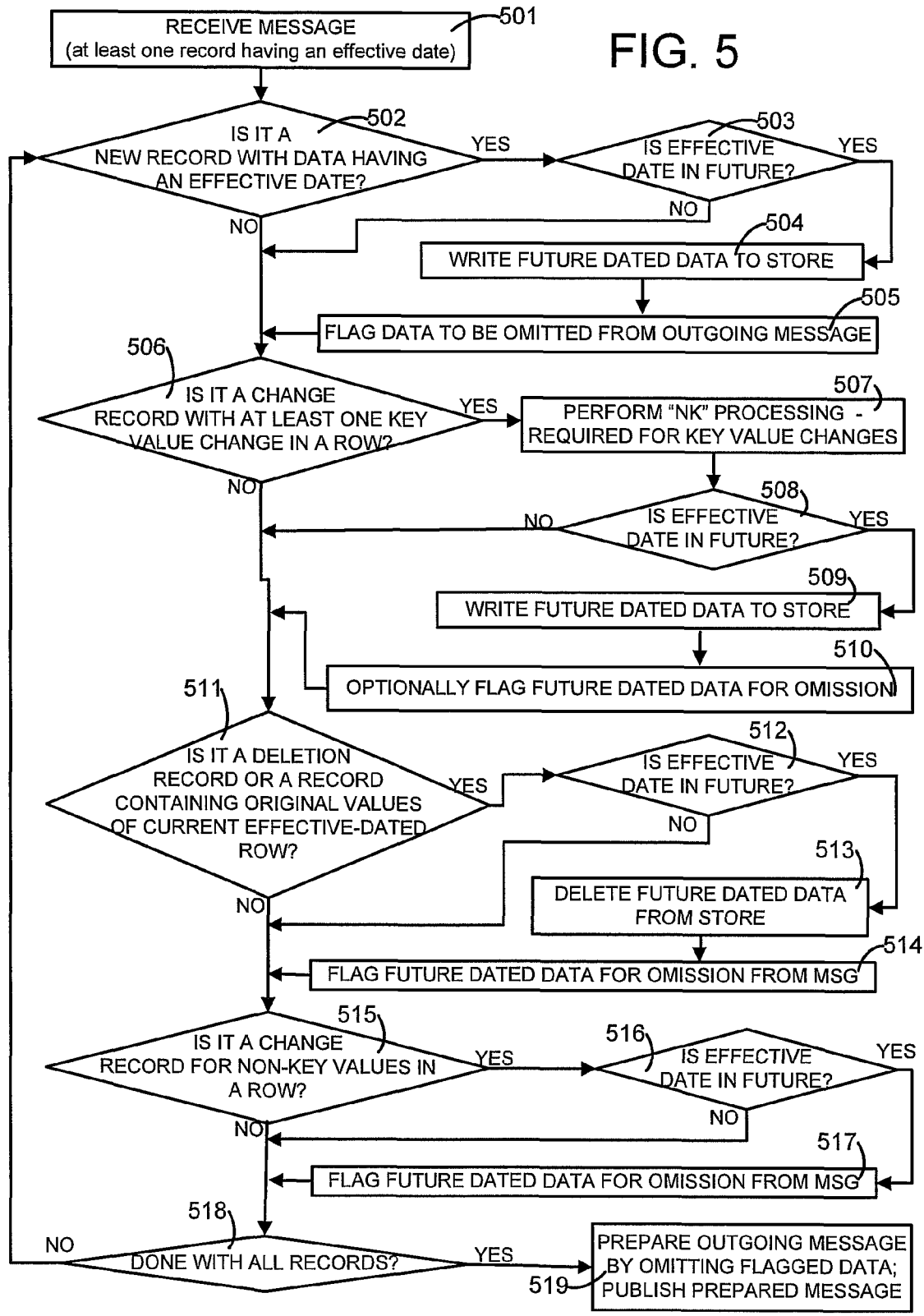

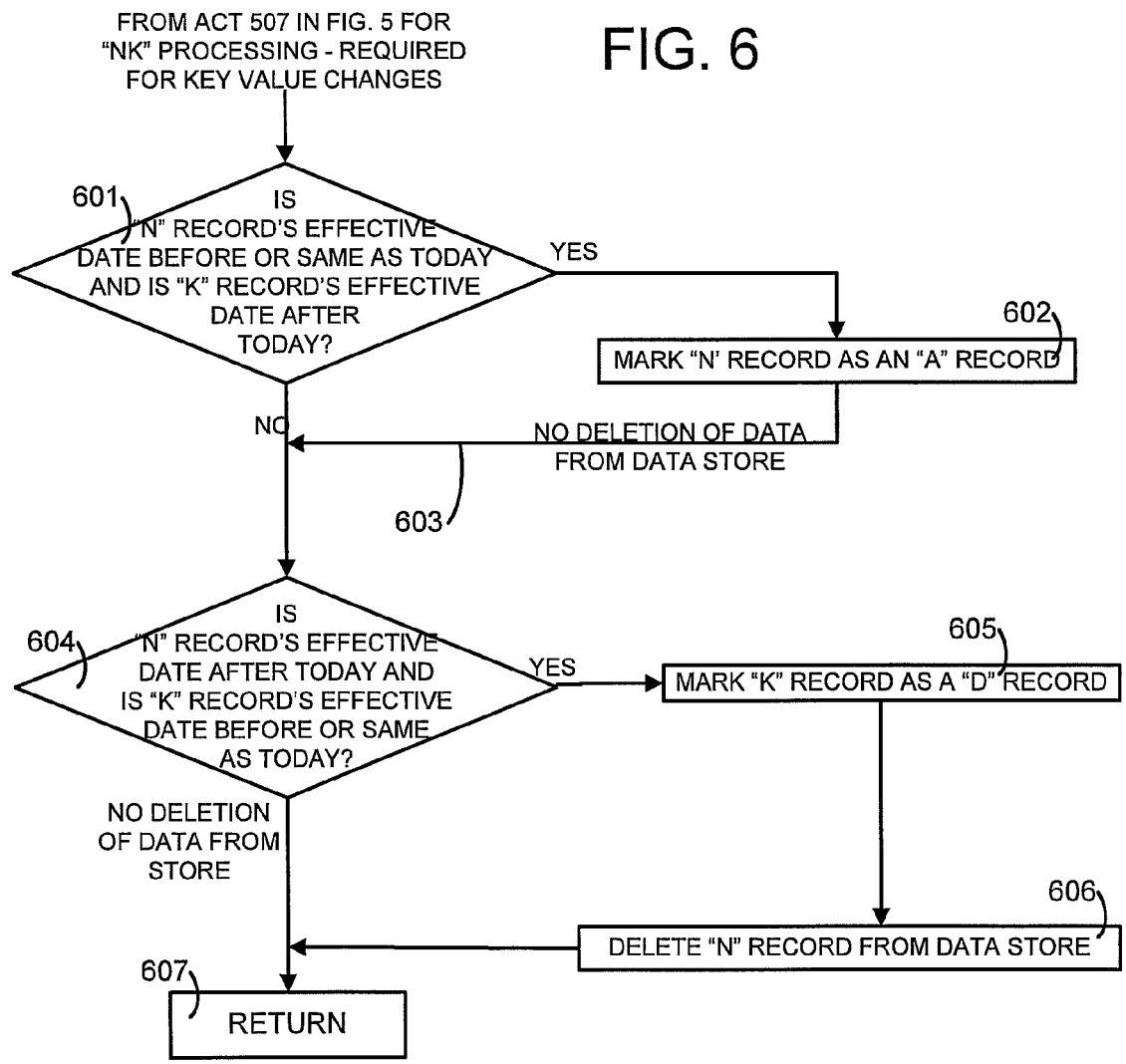

FIG. 7

SCENARIO 1

Biographical Details | Addresses | Regional | Prospect Career Data | Prospect Program Data Susan Young  AA0025
Academic Career: Graduate   Institution: PSUNV

| Admit Term: | 0330 | 1998 Fall | ☑ Applied |
| Admit Type: | NEW | New Student | |
| Campus: | MAIN | Main Hacienda Campus | |
| Academic Load: | Full-Time | | |
| Academic Level: | Graduate | | |
| Housing: | | | |

☐ Financial Aid Interest

Recruiting Information

| *Recruiting Status: | Applicant | Referral Source: | |
| Status Date: | 14/09/1998 | Source Date: | 14/09/1998 |
| Created On: | 14/09/1998 | *Recruiting Center: | GRMT  Grad Math |

Transfer To: Education   [Go]

[Save] [Return to Search] [Notify] [Refresh]   [Add] [Update/Display] [Include History]

FIG. 8

SCENARIO 1

Visa/Permit Data

Visa/Permit Data   Find | View All   First  1 of 1  Last

| *Country: | USA  USA | | | |
| *Type: | J-1  Exchange Visitor | | Get Supporting Documents | |
| Classification: | Visa | | | |
| *Effective Date: | 01/01/2008 | | | |
| Number: | 11167567 | *Status: | Granted | *Status Date: | 22/01/2008 |
| Issue Date: | 01/01/2008 | Duration: | 7.0 | *Duration Type: | Months |
| Date of Entry into Country: | 04/01/2008 | Expiration Date: | 01/08/2008 | | |
| Issuing Authority: | ABC VISAS | | | |
| Issue Place: | Alabama | | | |

Supporting Documents Needed   Customize | Find | View All    First 1 of 1 Last

| *Document ID | Description | Request Date | Date Received | |
| CONTR | Contract/Offer Letter | 17/01/2008 | | |

[OK] [Cancel]

FIG. 9

```xml
<?xml version='1.0'?>
<SCC_PROSPECT_UPDATE>                                         SCENARIO 1
  <ADM_PRSPCT_CAR class="R">
    <EMPLID IsChanged="Y">AA0025</EMPLID>
    <ACAD_CAREER IsChanged="Y">GRAD</ACAD_CAREER>
    <INSTITUTION IsChanged="Y">PSUNV</INSTITUTION>
    <ADMIT_TERM IsChanged="Y">0330</ADMIT_TERM>
    <ADMIT_TYPE IsChanged="Y">NEW</ADMIT_TYPE>
    <ADM_RECR_CTR IsChanged="Y">GRMT</ADM_RECR_CTR>
    <LAST_SCH_ATTEND></LAST_SCH_ATTEND>
    <GRADUATION_DT></GRADUATION_DT>
    <RECRUITING_STATUS IsChanged="Y">APPL</RECRUITING_STATUS>
    <RECR_STATUS_DT IsChanged="Y">1998-09-14</RECR_STATUS_DT>
    <APPL_ON_FILE IsChanged="Y">Y</APPL_ON_FILE>
    <FIN_AID_INTEREST IsChanged="Y">N</FIN_AID_INTEREST>
    <HOUSING_INTEREST></HOUSING_INTEREST>
    <ACAD_LOAD_APPR IsChanged="Y">F</ACAD_LOAD_APPR>
    <ADM_REFRL_SRCE></ADM_REFRL_SRCE>
    <REFERRAL_SRCE_DT IsChanged="Y">1998-09-14</REFERRAL_SRCE_DT>
    <REGION></REGION>
    <REGION_FROM></REGION_FROM>
    <RECRUITER_ID></RECRUITER_ID>
    <ADM_CREATION_DT IsChanged="Y">1998-09-14</ADM_CREATION_DT>
    <ACADEMIC_LEVEL IsChanged="Y">GR</ACADEMIC_LEVEL>
901 <CAMPUS IsChanged="Y">MAIN</CAMPUS>
    <SCC_VISA_PMT_H class="R">                                    902
      <EMPLID IsChanged="Y">AA0025</EMPLID>
      <DEPENDENT_ID IsChanged="Y">01</DEPENDENT_ID>
      <COUNTRY IsChanged="Y">USA</COUNTRY>
      <VISA_PERMIT_TYPE IsChanged="Y">J-1</VISA_PERMIT_TYPE>
      <EFFDT IsChanged="Y">2008-01-01</EFFDT>
      <VISA_WRKPMT_NBR IsChanged="Y">11167567</VISA_WRKPMT_NBR>
      <VISA_WRKPMT_STATUS IsChanged="Y">G</VISA_WRKPMT_STATUS>
      <STATUS_DT IsChanged="Y">2008-01-22</STATUS_DT>
      <DT_ISSUED IsChanged="Y">2008-01-01</DT_ISSUED>
      <PLACE_ISSUED IsChanged="Y">Alabama</PLACE_ISSUED>
      <DURATION_TIME IsChanged="Y">7</DURATION_TIME>
      <DURATION_TYPE IsChanged="Y">M</DURATION_TYPE>
      <ENTRY_DT IsChanged="Y">2008-01-04</ENTRY_DT>
      <EXPIRATN_DT IsChanged="Y">2008-08-01</EXPIRATN_DT>
      <ISSUING_AUTHORITY IsChanged="Y">ABC VISAS</ISSUING_AUTHORITY>
    </SCC_VISA_PMT_H>
    <PSCAMA class="R">
      <AUDIT_ACTN>A</AUDIT_ACTN>
    </PSCAMA>            903
  </ADM_PRSPCT_CAR>   904
  <PSCAMA class="R">
    <LANGUAGE_CD>ENG</LANGUAGE_CD>
    <AUDIT_ACTN>C</AUDIT_ACTN>
    <BASE_LANGUAGE_CD>ENG</BASE_LANGUAGE_CD>
    <MSG_SEQ_FLG></MSG_SEQ_FLG>
    <PROCESS_INSTANCE>0</PROCESS_INSTANCE>
    <PUBLISH_RULE_ID></PUBLISH_RULE_ID>
    <MSGNODENAME></MSGNODENAME>
  </PSCAMA>
</SCC_PROSPECT_UPDATE>
```

FIG. 10

SCENARIO 1

- SCC_PROSPECT_UPDATE
  - ADM_PRSPCT_CAR
    - EMPLID
    - ACAD_CAREER
    - INSTITUTION
    - ADMIT_TERM
    - ADMIT_TYPE
    - ADM_RECR_CTR
    - LAST_SCH_ATTEND
    - GRADUATION_DT
    - RECRUITING_STATUS
    - RECR_STATUS_DT
    - APPL_ON_FILE
    - FIN_AID_INTEREST
    - HOUSING_INTEREST
    - ACAD_LOAD_APPR
    - ADM_REFRL_SRCE
    - REFERRAL_SRCE_DT
    - REGION
    - REGION_FROM
    - RECRUITER_ID
    - ADM_CREATION_DT
    - ACADEMIC_LEVEL
    - CAMPUS
    - SCC_VISA_PMT_H
      - EMPLID
      - DEPENDENT_ID
      - COUNTRY
      - VISA_PERMIT_TYPE
      - EFFDT
      - VISA_WRKPMT_NBR
      - VISA_WRKPMT_STATUS
      - STATUS_DT
      - DT_ISSUED
      - PLACE_ISSUED
      - DURATION_TIME
      - DURATION_TYPE
      - ENTRY_DT
      - EXPIRATN_DT
      - ISSUING_AUTHORITY

FIG. 13

SCENARIO 2

```xml
<SCC_PROSPECT_UPDATE>
    <ADM_PRSPCT_CAR class="R">
        <EMPLID IsChanged="Y">AA0025</EMPLID>
        <ACAD_CAREER IsChanged="Y">GRAD</ACAD_CAREER>
        <INSTITUTION IsChanged="Y">PSUNV</INSTITUTION>
        <ADMIT_TERM IsChanged="Y">0330</ADMIT_TERM>
        <ADMIT_TYPE IsChanged="Y">NEW</ADMIT_TYPE>
        <ADM_RECR_CTR IsChanged="Y">GRMT</ADM_RECR_CTR>
        <LAST_SCH_ATTEND></LAST_SCH_ATTEND>
        <GRADUATION_DT></GRADUATION_DT>
        <RECRUITING_STATUS IsChanged="Y">APPL</RECRUITING_STATUS>
        <RECR_STATUS_DT IsChanged="Y">1998-09-14</RECR_STATUS_DT>
        <APPL_ON_FILE IsChanged="Y">N</APPL_ON_FILE>
        <FIN_AID_INTEREST IsChanged="Y">N</FIN_AID_INTEREST>
        <HOUSING_INTEREST></HOUSING_INTEREST>
        <ACAD_LOAD_APPR IsChanged="Y">F</ACAD_LOAD_APPR>
        <ADM_REFRL_SRCE></ADM_REFRL_SRCE>
        <REFERRAL_SRCE_DT IsChanged="Y">1998-09-14</REFERRAL_SRCE_DT>
        <REGION></REGION>
        <REGION_FROM></REGION_FROM>
        <RECRUITER_ID></RECRUITER_ID>
        <ADM_CREATION_DT IsChanged="Y">1998-09-14</ADM_CREATION_DT>
        <ACADEMIC_LEVEL IsChanged="Y">GR</ACADEMIC_LEVEL>
        <CAMPUS IsChanged="Y">MAIN</CAMPUS>
        <SCC_VISA_PMT_H class="R">                                    ─1301
           <EMPLID IsChanged="Y">AA0025</EMPLID>
           <DEPENDENT_ID IsChanged="Y">01</DEPENDENT_ID>
           <COUNTRY IsChanged="Y">USA</COUNTRY>
           <VISA_PERMIT_TYPE IsChanged="Y">J-1</VISA_PERMIT_TYPE>
           <EFFDT IsChanged="Y">2008-02-29</EFFDT>
           <VISA_WRKPMT_NBR IsChanged="Y">11167567</VISA_WRKPMT_NBR>
           <VISA_WRKPMT_STATUS IsChanged="Y">G</VISA_WRKPMT_STATUS>
           <STATUS_DT IsChanged="Y">2008-02-04</STATUS_DT>
           <DT_ISSUED IsChanged="N"></DT_ISSUED>
           <PLACE_ISSUED IsChanged="Y">Alabama</PLACE_ISSUED>
           <DURATION_TIME IsChanged="Y">7</DURATION_TIME>
           <DURATION_TYPE IsChanged="Y">M</DURATION_TYPE>
           <ENTRY_DT IsChanged="N"></ENTRY_DT>
           <EXPIRATN_DT IsChanged="N"></EXPIRATN_DT>
           <ISSUING_AUTHORITY IsChanged="Y">ABC VISAS</ISSUING_AUTHORITY>
        </SCC_VISA_PMT_H>
        <PSCAMA class="R">
            <AUDIT_ACTN>N</AUDIT_ACTN>                ─1302
        </PSCAMA>
        <SCC_VISA_PMT_H class="R">                                    ─1303
           <EMPLID>AA0025</EMPLID>
           <DEPENDENT_ID></DEPENDENT_ID>
           <COUNTRY>USA</COUNTRY>
           <VISA_PERMIT_TYPE>J-1</VISA_PERMIT_TYPE>
           <EFFDT>2008-01-01</EFFDT>
           <VISA_WRKPMT_NBR>11167567</VISA_WRKPMT_NBR>
           <VISA_WRKPMT_STATUS>G</VISA_WRKPMT_STATUS>
           <STATUS_DT>2008-01-22</STATUS_DT>
           <DT_ISSUED>2008-01-01</DT_ISSUED>
           <PLACE_ISSUED>Alabama</PLACE_ISSUED>
           <DURATION_TIME>7</DURATION_TIME>
           <DURATION_TYPE>M</DURATION_TYPE>
           <ENTRY_DT>2008-01-04</ENTRY_DT>
           <EXPIRATN_DT>2008-08-01</EXPIRATN_DT>
           <ISSUING_AUTHORITY>ABC VISAS</ISSUING_AUTHORITY>
        </SCC_VISA_PMT_H>
        <PSCAMA class="R">
            <AUDIT_ACTN>K</AUDIT_ACTN>                ─1304
        </PSCAMA>
    </ADM_PRSPCT_CAR>          ─1305
    <PSCAMA class="R">
        <LANGUAGE_CD>ENG</LANGUAGE_CD>
        <AUDIT_ACTN>C</AUDIT_ACTN>
        <BASE_LANGUAGE_CD>ENG</BASE_LANGUAGE_CD>
        <MSG_SEQ_FLG></MSG_SEQ_FLG>
        <PROCESS_INSTANCE>0</PROCESS_INSTANCE>
        <PUBLISH_RULE_ID></PUBLISH_RULE_ID>
        <MSGNODENAME></MSGNODENAME>
    </PSCAMA>
</SCC_PROSPECT_UPDATE>
```

FIG. 14

SCENARIO 2

```xml
<SCC_PROSPECT_UPDATE>
    <ADM_PRSPCT_CAR class="R">
        <EMPLID IsChanged="Y">AA0025</EMPLID>
        <ACAD_CAREER IsChanged="Y">GRAD</ACAD_CAREER>
        <INSTITUTION IsChanged="Y">PSUNV</INSTITUTION>
        <ADMIT_TERM IsChanged="Y">0330</ADMIT_TERM>
        <ADMIT_TYPE IsChanged="Y">NEW</ADMIT_TYPE>
        <ADM_RECR_CTR IsChanged="Y">GRMT</ADM_RECR_CTR>
        <LAST_SCH_ATTEND></LAST_SCH_ATTEND>
        <GRADUATION_DT></GRADUATION_DT>
        <RECRUITING_STATUS IsChanged="Y">APPL</RECRUITING_STATUS>
        <RECR_STATUS_DT IsChanged="Y">1998-09-14</RECR_STATUS_DT>
        <APPL_ON_FILE IsChanged="Y">Y</APPL_ON_FILE>
        <FIN_AID_INTEREST IsChanged="Y">N</FIN_AID_INTEREST>
        <HOUSING_INTEREST></HOUSING_INTEREST>
        <ACAD_LOAD_APPR IsChanged="Y">F</ACAD_LOAD_APPR>
        <ADM_REFRL_SRCE></ADM_REFRL_SRCE>
        <REFERRAL_SRCE_DT IsChanged="Y">1998-09-14</REFERRAL_SRCE_DT>
        <REGION></REGION>
        <REGION_FROM></REGION_FROM>
        <RECRUITER_ID></RECRUITER_ID>
        <ADM_CREATION_DT IsChanged="Y">1998-09-14</ADM_CREATION_DT>
        <ACADEMIC_LEVEL IsChanged="Y">GR</ACADEMIC_LEVEL>
        <CAMPUS IsChanged="Y">WALCR</CAMPUS>                        ―1401
        <SCC_VISA_PMT_H class="R">
            <EMPLID IsChanged="Y">AA0025</EMPLID>
            <DEPENDENT_ID IsChanged="Y"></DEPENDENT_ID>
            <COUNTRY IsChanged="Y">USA</COUNTRY>
            <VISA_PERMIT_TYPE IsChanged="Y">J-1</VISA_PERMIT_TYPE>
            <EFFDT IsChanged="Y">2008-01-01</EFFDT>
            <VISA_WRKPMT_NBR IsChanged="Y">11167567</VISA_WRKPMT_NBR>
            <VISA_WRKPMT_STATUS IsChanged="Y">G</VISA_WRKPMT_STATUS>
            <STATUS_DT IsChanged="Y">2008-01-21</STATUS_DT>
            <DT_ISSUED IsChanged="Y">2008-01-01</DT_ISSUED>
            <PLACE_ISSUED IsChanged="Y">Alabama</PLACE_ISSUED>
            <DURATION_TIME IsChanged="Y">7</DURATION_TIME>
            <DURATION_TYPE IsChanged="Y">M</DURATION_TYPE>
            <ENTRY_DT IsChanged="Y">2008-01-04</ENTRY_DT>
            <EXPIRATN_DT IsChanged="Y">2008-08-01</EXPIRATN_DT>
            <ISSUING_AUTHORITY IsChanged="Y">ABC VISAS</ISSUING_AUTHORITY>
        </SCC_VISA_PMT_H>
        <PSCAMA class="R">
            <AUDIT_ACTN IsChanged="Y">D</AUDIT_ACTN>―――――1402
        </PSCAMA>
    </ADM_PRSPCT_CAR>
    <PSCAMA class="R">
        <LANGUAGE_CD>ENG</LANGUAGE_CD>
        <AUDIT_ACTN>C</AUDIT_ACTN>
        <BASE_LANGUAGE_CD>ENG</BASE_LANGUAGE_CD>
        <MSG_SEQ_FLG></MSG_SEQ_FLG>
        <PROCESS_INSTANCE>0</PROCESS_INSTANCE>
        <PUBLISH_RULE_ID></PUBLISH_RULE_ID>
        <MSGNODENAME></MSGNODENAME>
    </PSCAMA>
</SCC_PROSPECT_UPDATE>
```

FIG. 15

SCENARIO 2

```
SELECT * FROM PS_SCC_EFFDELAY
```

| | MSGNAME | RECNAME | LANGUAGE_CD | EFFDT | SEQ_NBR | KEY_CHAR_40_01 |
|---|---|---|---|---|---|---|
| 1 | SCC_PROSPECT_UPDATE | SCC_VISA_PMT_H | ENG | 2008-02-29 00:00:00.000 | 1 | AA0025 |

| | KEY_CHAR_40_02 | KEY_CHAR_40_03 | KEY_CHAR_40_04 | KEY_CHAR_40_05 | KEY_CHAR_40_06 | KEY_CHAR_40_07 | KEY_CHAR_40_08 |
|---|---|---|---|---|---|---|---|
| 1 | 01 | USA | J-1 | 2008-02-29 | | | |

| | KEY_CHAR_40_09 | KEY_CHAR_40_10 | IN_PROCESS_FLG | KEYCOUNT | KEY_FIELD_NAME_01 | KEY_FIELD_NAME_02 | KEY_FIELD_NAME_03 |
|---|---|---|---|---|---|---|---|
| 1 | | | | 0 | EMPLID | DEPENDENT_ID | COUNTRY |

| | KEY_FIELD_NAME_04 | KEY_FIELD_NAME_05 | KEY_FIELD_NAME_06 | KEY_FIELD_NAME_07 | KEY_FIELD_NAME_08 | KEY_FIELD_NAME_09 |
|---|---|---|---|---|---|---|
| 1 | VISA_PERMIT_TYPE | EFFDT | | | | |

| KEY_FIELD_NAME_10 | AUDIT_ACTN | MSGNODENAME |
|---|---|---|
| | N | |

FIG. 16

SCENARIO 3

Visa/Permit Data

Visa/Permit Data                                                                 Find | View All    First ◀ 1 of 2 ▶ Last

| | |
|---|---|
| *Country: | USA 🔍 USA |
| *Type: | J-2 🔍 Spouse/Child of Exchg Visitor |
| Classification: | Visa |
| *Effective Date: | 04/02/2008 |
| Number: | 1111 |
| *Status: | Granted |
| *Status Date: | 04/02/2008 |
| Issue Date: | 04/02/2008 |
| Duration: | 7.0 |
| *Duration Type: | Months |
| Date of Entry into Country: | 05/02/2008 |
| Expiration Date: | 04/09/2008 |
| Issuing Authority: | XYZ VISAS |
| Issue Place: | Hazard County |

Get Supporting Documents

Supporting Documents Needed     Customize | Find | View All    First ◀ 1 of 1 ▶ Last

| *Document ID | Description | Request Date | Date Received | |
|---|---|---|---|---|
| 🔍 | | | | + − |

OK    Cancel

FIG. 17

SCENARIO 3

Visa/Permit Data

| | | |
|---|---|---|
| *Country: | USA  USA | |
| *Type: | J-1  Exchange Visitor | Get Supporting Documents |
| Classification: | Visa | |
| *Effective Date: | 29/02/2008 | |
| Number: | 11167567 | *Status: Applied   *Status Date: 04/02/2008 |
| Issue Date: | | Duration: 7.0   *Duration Type: Months |
| Date of Entry into Country: | | Expiration Date: |
| Issuing Authority: | ABC VISAS | |
| Issue Place: | Alabama | |

Supporting Documents Needed

| Document ID | Description | Request Date | Date Received |
|---|---|---|---|
| CONTR | Contract/Offer Letter | 04/02/2008 | |

[ OK ]  [ Cancel ]

FIG. 19

SCENARIO 3

SELECT * FROM PS_SCC_EFFDELAY

| | MSGNAME | RECNAME | LANGUAGE_CD | EFFDT | SEQ_NBR | KEY_CHAR_40_01 |
|---|---|---|---|---|---|---|
| 1 | SCC_PROSPECT_UPDATE | SCC_VISA_PMT_H | ENG | 2008-02-29 00:00:00.000 | 1 | AA0025 |

FIG. 18

SCENARIO 3

```xml
<SCC_PROSPECT_UPDATE>
    <ADM_PRSPCT_CAR class="R">
        <EMPLID IsChanged="Y">AA0025</EMPLID>
        <ACAD_CAREER IsChanged="Y">GRAD</ACAD_CAREER>
        <INSTITUTION IsChanged="Y">PSUNV</INSTITUTION>
        <ADMIT_TERM IsChanged="Y">0330</ADMIT_TERM>
        <ADMIT_TYPE IsChanged="Y">NEW</ADMIT_TYPE>
        <ADM_RECR_CTR IsChanged="Y">GRMT</ADM_RECR_CTR>
        <LAST_SCH_ATTEND></LAST_SCH_ATTEND>
        <GRADUATION_DT></GRADUATION_DT>
        <RECRUITING_STATUS IsChanged="Y">APPL</RECRUITING_STATUS>
        <RECR_STATUS_DT IsChanged="Y">1998-09-14</RECR_STATUS_DT>
        <APPL_ON_FILE IsChanged="Y">N</APPL_ON_FILE>
        <FIN_AID_INTEREST IsChanged="Y">N</FIN_AID_INTEREST>
        <HOUSING_INTEREST></HOUSING_INTEREST>
        <ACAD_LOAD_APPR IsChanged="Y">F</ACAD_LOAD_APPR>
        <ADM_REFRL_SRCE></ADM_REFRL_SRCE>
        <REFERRAL_SRCE_DT IsChanged="Y">1998-09-14</REFERRAL_SRCE_DT>
        <REGION></REGION>
        <REGION_FROM></REGION_FROM>
        <RECRUITER_ID></RECRUITER_ID>
        <ADM_CREATION_DT IsChanged="Y">1998-09-14</ADM_CREATION_DT>
        <ACADEMIC_LEVEL IsChanged="Y">GR</ACADEMIC_LEVEL>
        <CAMPUS IsChanged="Y">MAIN</CAMPUS>                         1801
        <SCC_VISA_PMT_H class="R">
            <EMPLID IsChanged="Y">AA0025</EMPLID>
            <DEPENDENT_ID IsChanged="Y">01</DEPENDENT_ID>
            <COUNTRY IsChanged="Y">USA</COUNTRY>
            <VISA_PERMIT_TYPE IsChanged="Y">J-2</VISA_PERMIT_TYPE>
            <EFFDT IsChanged="Y">2008-02-04</EFFDT>
            <VISA_WRKPMT_NBR IsChanged="Y">1111</VISA_WRKPMT_NBR>
            <VISA_WRKPMT_STATUS IsChanged="Y">G</VISA_WRKPMT_STATUS>
            <STATUS_DT IsChanged="Y">2008-02-04</STATUS_DT>
            <DT_ISSUED IsChanged="N"></DT_ISSUED>
            <PLACE_ISSUED IsChanged="Y">Hazard County</PLACE_ISSUED>
            <DURATION_TIME IsChanged="Y">7</DURATION_TIME>
            <DURATION_TYPE IsChanged="Y">M</DURATION_TYPE>
            <ENTRY_DT IsChanged="N"></ENTRY_DT>
            <EXPIRATN_DT IsChanged="N"></EXPIRATN_DT>
            <ISSUING_AUTHORITY IsChanged="Y">XYZ VISAS</ISSUING_AUTHORITY>
        </SCC_VISA_PMT_H>
        <PSCAMA class="R">
            <AUDIT_ACTN>A</AUDIT_ACTN>                              1802
        </PSCAMA>
    </ADM_PRSPCT_CAR>
    <PSCAMA class="R">
        <LANGUAGE_CD>ENG</LANGUAGE_CD>
        <AUDIT_ACTN>C</AUDIT_ACTN>
        <BASE_LANGUAGE_CD>ENG</BASE_LANGUAGE_CD>
        <MSG_SEQ_FLG></MSG_SEQ_FLG>
        <PROCESS_INSTANCE>0</PROCESS_INSTANCE>
        <PUBLISH_RULE_ID></PUBLISH_RULE_ID>
        <MSGNODENAME></MSGNODENAME>
    </PSCAMA>
</SCC_PROSPECT_UPDATE>
```

FIG. 20

SCENARIO 4

```
UPDATE PS_SCC_EFFDELAY SET EFFDT = '2008-02-03'
SELECT * FROM PS_SCC_EFFDELAY
```

| | MSGNAME | RECNAME | LANGUAGE_CD | EFFDT | SEQ_NBR | KEY_CHAR_40_01 |
|---|---|---|---|---|---|---|
| 1 | SCC PROSPECT UPDATE | SCC VISA PMT H | ENG | 2008-02-03 00:00:00.000 | 1 | AA0025 |

FIG. 21

```
<SCC_PROSPECT_UPDATE>                                              SCENARIO 5
   <ADM_PRSPCT_CAR class="R">
      <EMPLID IsChanged="Y">AA0025</EMPLID>
      <ACAD_CAREER IsChanged="Y">GRAD</ACAD_CAREER>
      <INSTITUTION IsChanged="Y">PSUNV</INSTITUTION>
      <ADMIT_TERM IsChanged="Y">0330</ADMIT_TERM>
      <ADMIT_TYPE IsChanged="Y">NEW</ADMIT_TYPE>
      <ADM_RECR_CTR IsChanged="Y">GRMT</ADM_RECR_CTR>
      <LAST_SCH_ATTEND></LAST_SCH_ATTEND>
      <GRADUATION_DT></GRADUATION_DT>
      <RECRUITING_STATUS IsChanged="Y">APPL</RECRUITING_STATUS>
      <RECR_STATUS_DT IsChanged="Y">1998-09-14</RECR_STATUS_DT>
      <APPL_ON_FILE IsChanged="Y">N</APPL_ON_FILE>
      <FIN_AID_INTEREST IsChanged="Y">N</FIN_AID_INTEREST>
      <HOUSING_INTEREST></HOUSING_INTEREST>
      <ACAD_LOAD_APPR IsChanged="Y">F</ACAD_LOAD_APPR>
      <ADM_REFRL_SRCE></ADM_REFRL_SRCE>
      <REFERRAL_SRCE_DT IsChanged="Y">1998-09-14</REFERRAL_SRCE_DT>
      <REGION></REGION>
      <REGION_FROM></REGION_FROM>
      <RECRUITER_ID></RECRUITER_ID>
      <ADM_CREATION_DT IsChanged="Y">1998-09-14</ADM_CREATION_DT>
      <ACADEMIC_LEVEL IsChanged="Y">GR</ACADEMIC_LEVEL>
      <CAMPUS IsChanged="Y">WCRK</CAMPUS>
      <SCC_VISA_PMT_H class="R">
         <EMPLID IsChanged="Y">AA0025</EMPLID>
         <DEPENDENT_ID IsChanged="Y">01</DEPENDENT_ID>
         <COUNTRY IsChanged="Y">USA</COUNTRY>
         <VISA_PERMIT_TYPE IsChanged="Y">J-1</VISA_PERMIT_TYPE>
         <EFFDT IsChanged="Y">2008-02-03</EFFDT>
         <VISA_WRKPMT_NBR IsChanged="Y">11167567</VISA_WRKPMT_NBR>
         <VISA_WRKPMT_STATUS IsChanged="Y">G</VISA_WRKPMT_STATUS>
         <STATUS_DT IsChanged="Y">2008-02-04</STATUS_DT>
         <DT_ISSUED IsChanged="N"></DT_ISSUED>
         <PLACE_ISSUED IsChanged="Y">Alabama</PLACE_ISSUED>
         <DURATION_TIME IsChanged="Y">7</DURATION_TIME>
         <DURATION_TYPE IsChanged="Y">M</DURATION_TYPE>
         <ENTRY_DT IsChanged="N"></ENTRY_DT>
         <EXPIRATN_DT IsChanged="N"></EXPIRATN_DT>
         <ISSUING_AUTHORITY IsChanged="Y">ABC VISAS</ISSUING_AUTHORITY>
      </SCC_VISA_PMT_H>
      <PSCAMA class="R">
         <AUDIT_ACTN>A</AUDIT_ACTN>
      </PSCAMA>
   </ADM_PRSPCT_CAR>
   <PSCAMA class="R">
      <LANGUAGE_CD>ENG</LANGUAGE_CD>
      <AUDIT_ACTN>C</AUDIT_ACTN>
      <BASE_LANGUAGE_CD>ENG</BASE_LANGUAGE_CD>
      <MSG_SEQ_FLG></MSG_SEQ_FLG>
      <PROCESS_INSTANCE>0</PROCESS_INSTANCE>
      <PUBLISH_RULE_ID></PUBLISH_RULE_ID>
      <MSGNODENAME></MSGNODENAME>
   </PSCAMA>
</SCC_PROSPECT_UPDATE>
```

FIG. 22

```
BEGIN_MAIN

1..FOR EACH Record in the Hierarchical XML Message structure DO
2..   IF AUDIT ACTION = "A" THEN
3..      IF Data is FUTURE EFFDT THEN
4..         Save Data to DataStore
5..         Flag Data to be deleted from outgoing message
6..      END
7..   END
8..   IF AUDIT ACTION = "N" THEN
9..      Perform "Special NK Processing"
10.      IF Data is FUTURE EFFDT THEN
11.         Save Data to DataStore
12.         Optionally Flag Data to be deleted from outgoing message (Special NK processing)
13.      END
14.   END
15.   IF AUDIT ACTION = "D" OR "K" THEN
16.      IF Data is FUTURE EFFDT THEN
17.         Delete Data from DataStore
18.         Flag Data to be deleted from outgoing message
19.      END
20.   END
21.   IF AUDIT ACTION = "C" THEN
22.      IF Data is FUTURE EFFDT THEN
23.         Flag Data to be deleted from outgoing message
24.      END
25.   END
26. ENDFOR 27. Remove any data from the overall message which has been flagged for delete by the above logic.

END_MAIN

BEGIN Special NK Processing loop:

28. IF "N" RECORD'S EFFDT <= TODAYS_DATE AND
    "K" RECORD'S EFFDT > TODAYS_DATE THEN
        (meaning N record is a new current dated record, K record is the old future dated record)
29.     Mark "N" record as an "A" record
30.     Do not Delete any Data FROM DataStore
31. ELSE
32. IF "N" RECORD'S EFFDT > TODAYS_DATE AND
        "K" RECORD'S EFFDT <= TODAYS_DATE THEN
        (meaning N record is the new Future dated record, K row is the old record)
33.     Mark "K" record as an "D" row
34.     Delete "N" record from the DataStore
35. OTHERWISE
36.     Do not Delete any Data FROM DataStore
37. END END Special NK Processing loop:
```

FIG. 23

```
import SCC_SERVICE:EventNotification;

/**
 * The ProspectUpdatedEvent. Fired when prospect data is created or altered.
 **/ class ProspectUpdatedEvent extends SCC_SERVICE:EventNotification
   method ProspectUpdatedEvent(&p_levelZeroRS As Rowset, &p_moduleName As string,
&p_operationName As string);
   method populateMessage(&p_msg As Message out);
end-class;

/* constructor */
method ProspectUpdatedEvent
   /+ &p_levelZeroRS as Rowset, +/
   /+ &p_moduleName as String, +/
   /+ &p_operationName as String +/

%Super = create SCC_SERVICE:EventNotification(&p_levelZeroRS, &p_moduleName,
&p_operationName);

end-method;

method populateMessage
   /+ &p_msg as Message out +/

%Super.populateMessage(&p_msg);

/* Set dependent ID */
   Local Rowset &lv0 = &p_msg.GetRowset();
   &lv0(1).GetRowset(1)(1).SCC_VISA_PMT_H.DEPENDENT_ID.Value = "01";

end-method;
```

FIG. 24

| | | |
|---|---|---|
| Event Register | | |
| *Service Operation: | SCC_PROSPECT_UPDATE | |
| Description: | Prospect Update | |
| Description: | | |
| Object Owner ID: | Campus Community | |
| ☑ Event Replay Support | | ☑ EFFDT Filtering |

Customize | Find | View All | First ◁ 1 of 1 ▷ Last

| | Integration Mode | Recurrence Name | Chunk Size | |
|---|---|---|---|---|
| 1 | Effective Dated | Daily | 100 | + − |

| | |
|---|---|
| Package Name: | SCC_DEMO_SERVICE |
| Path: | : |
| Class ID: | ProspectUpdatedEvent |

APPLICATION INTEGRATION FRAMEWORK

BACKGROUND

It is well known in the prior art for a business to use in its normal every day activities, computers that are programmed with software customized for the business. For example, a university (such as Stanford University in Palo Alto, Calif., USA) may maintain a database of information on (1) students and (2) employees by use of "Campus Solutions" software available from Oracle Corporation, Redwood Shores, California, USA. Such software implements logic and holds data that is specific to the business (such as a university), and hence the software is commonly known as an application program (as opposed to other software, such as an operating system). A business may perform different business functions using different application programs (also referred to as simply "applications") which may need to exchange data with one another. For example, a student's name and address information that is currently held within the "Campus Solutions" application by PEOPLESOFT may need to be transferred to a customer-relationship-management (CRM) application, e.g. if an alumnus student is to be sent a letter to solicit a donation for the university.

Such information transfer is typically implemented by use of additional software that is manually prepared in certain prior art technologies, as a rigid setup of point-to-point integrations between individual applications. Such additional software (hereinafter "point-to-point integration software") provides no flexibility or guidance as to how to develop, deploy and maintain such integrations in a dynamic ever changing market. Each point-to-point integration software was therefore costly to develop and even costlier to maintain ongoing as changes were required. Software engineers who developed a typical integration between two specific applications had to each time reinvent the wheel in dealing with many low level request/response cycle plumbing concerns which may be common to multiple integrations. A software engineer was typically given no guidance as to (1) how to approach integration development or (2) what preexisting point-to-point integration software would be most appropriate to use as a starting point for a new integration. Moreover, a user interface to manage point-to-point integration software was static and allowed very little dynamic changes to the online system. With a strong industry trend towards being able to deploy applications as 'packs', which are solely integration based in nature, there was no facility to manage the licensing and activation of individually licensable integration software. In an IT world moving away from rigid and fragile point-to-point integrations and towards a dynamic and flexible service oriented deployment platform, a need was identified for more flexible integration.

Information that is held within one application is typically transferred by an integration tool to another application in the form of one or more messages, which are published, for example in XML. One example of an integration tool for PEOPLESOFT applications is called "Integration Broker" which was introduced in a software suite called "PeopleTools 8.4" originally published by PeopleSoft, Inc. which software is now available from Oracle Corporation of Redwood Shores, California, USA. PEOPLESOFT Integration Broker supports synchronous messaging wherein the system expects a response before continuing further processing. PEOPLESOFT Integration Broker also supports asynchronous messaging wherein the system continues processing without waiting for a response. Asynchronous messaging allows a large volume of data to be published, as there is no need to wait for a response. Real-time integration uses synchronous messaging and component interfaces.

Other such integration tools, for an XML message exchange between applications, are well documented in the prior art, including, for example, US Patent Application Publications 20050096932, 20050171980 and 20050038779 owned by Computer Associates International, Inc. These three publications are incorporated by reference herein in their entirety as background. These three publications appear to describe software, called "publisher" which provides functionality to filter the information to be published in an XML message to a target application. See, for example, paragraph [0033] in US Patent Application Publications 20050096932.

An XML message that is published by a PEOPLESOFT application typically contains PSCAMA. PSCAMA is an acronym for PEOPLESOFT Common Application Message Attributes, which is a record that PEOPLESOFT applications add to a message structure, during information processing. The above-identified three publications by Computer Associates International, Inc. appear to describe the use of a filtering code in an audit action field (AUDIT_ACTN) of PSCAMA to filter data records in an XML message. Also, these three publications describe use of a sample XSL program to serve as a starting point for a customer, e.g. administrator, to develop custom XSL programs. See, for example, paragraphs [0043]-[0046] in US Patent Application Publications 20050096932.

In the above-described three publications by Computer Associates International, Inc., a feature called "effective dating" is apparently not used by their target application. Effective dating is a feature of PEOPLESOFT applications which provide the ability for a user to record certain information with a special property or attribute called an "Effective Date" (abbreviated EFFDT). Such information can be either in effect currently, or planned to become effective in future, depending on whether the effective date is before or after a current date in the computer. Hence, PEOPLESOFT applications typically produce an XML message containing effective-dated items (that is, a field with the name "EFFDT" and a value of a date by specifying a day of a month in a year). The inventor of the current application notes that the above-noted three publications appear to not disclose how to publish data that has a future effective date.

SUMMARY

In accordance with the invention, a computer is programmed to receive records to be published to a target application, including at least one record identified as not effective until a specified date in future. The target application is unable to delay its processing of the identified record(s) until after the specified date. Hence, the computer is programmed, e.g. by a software developer extending one or more predefined classes, to initially prepare and transmit to the target application, an outgoing message based on records that are not future dated, while omitting a new record that is to be effective in future. The computer stores the omitted data (of the new record) in a store, for data to be published in future. The computer is configured to automatically respond to a date in the store becoming current, by preparing and transmitting a new version of the outgoing message, based on to-be-published data from the store, and further based on a current version of previously published data if required to complete the message.

BRIEF DESCRIPTION OF THE FIGURES

FIG. 1 illustrates, in a block diagram, an example of data to be effective in future being entered by a user into a computer, and in accordance with the invention the computer publishing an initial version of the outgoing message omitting the future effective data, followed by publishing after the effective date a new version of the outgoing message including the omitted data that's now effective.

FIG. 2 illustrates, in a block diagram, flow of data internal to several embodiments of a computer that in accordance with the invention publishes multiple versions of an outgoing message, e.g. without and with future dated information.

FIGS. 3 and 4 illustrate, in flow charts, two processes of one embodiment in accordance with the invention that respectively generate the initial version of the outgoing message and the new version of the outgoing message illustrated in FIG. 2.

FIG. 5 illustrates, in a flow chart, various acts performed in one illustrative implementation of an embodiment of the invention illustrated in FIG. 3.

FIG. 6 illustrates, in another flow chart, implementation of an operation to perform NK processing, in an implementation of the type shown in FIG. 5.

FIGS. 7 and 8 illustrate screens of a graphical user interface implemented to receive visa data to be effective at a user specified in the past, in an example (called "Scenario 1") used to illustrate the invention.

FIG. 9 illustrates an XML message that is generated in response to receipt of the data in Scenario 1, by a method of the type illustrated in FIG. 3 in accordance with the invention.

FIG. 10 illustrates a display of the XML message of FIG. 9 by an XML parser.

FIGS. 13 and 14 illustrate two versions of a to-be-published message, before and after performance of the method of FIG. 3.

FIG. 15 illustrates a record present in the illustrative implementation of the data store of FIG. 2 in Scenario 2.

FIGS. 16 and 17 illustrate two screens of the graphical user interface of FIGS. 7 and 8 receiving additional input from the user in an additional example (called "Scenario 3") used to illustrate the invention.

FIG. 18 illustrates an XML message that is generated in response to receipt of the data in Scenario 3, by a method of the type illustrated in FIG. 3 in accordance with the invention.

FIG. 19 illustrates the identical record of FIG. 15 which remains unchanged in the illustrative data store, in Scenario 3.

FIG. 20 illustrates a manual change of the effective date, deliberately done in order to trigger the process of FIG. 4 in an illustrative example to show operation of the invention.

FIG. 21 illustrates a new version of an outgoing message including the omitted data that's now effective which is generated by the process of FIG. 4.

FIG. 22 illustrates logic, in pseudocode form, used in an illustrative implementation of the method of FIG. 3.

FIG. 23 illustrates a class called "EventNotification" which is extended by a software engineer, in one illustrative embodiment of the invention.

FIG. 24 illustrates a user interface to register the class extended by the software engineer in the illustrative embodiment.

DETAILED DESCRIPTION

Figure 11:
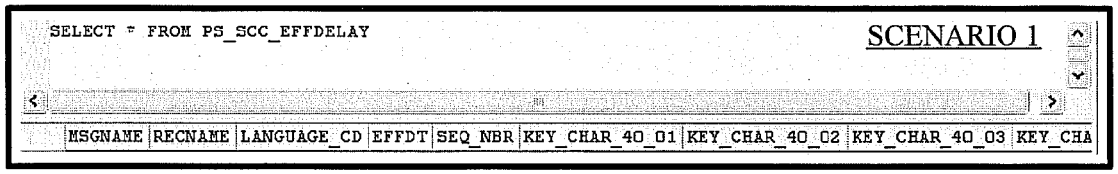
FIG. 11 illustrates an empty state of an illustrative implementation of the data store of FIG. 2 which is used to hold future effective data in accordance with the invention, in Scenario 1.

A computer 120 is programmed, in accordance with the invention, to receive information to be published, for example through a user interface as illustrated in FIG. 1. In a user interface of the type shown in FIG. 1, an employee of a university performs data entry in an incremental manner, e.g. one record at a time, which is illustrated by the entry of visa information for a student. For example, personal information about a student named "John Doe" (e.g. home address, past education etc) has been entered in an earlier screen (not shown in FIG. 1) of a Campus Solutions system implemented in computer 120. As this student was identified as a foreigner in the earlier screen, computer 120 displays a screen 110 on a video monitor, which is designed to receive visa information for this student. The university employee, as the user in this example, enters the student's visa information, e.g. by selecting "Dept of Security" as a visa issuing authority in a drop down box 112. In this manner, the university employee enters information about this student's visa in various fields, e.g. Visa Type, Visa Number, Visa Duration, and Effective Date. In this screen 110, the Effective Date identifies a specific date on which the visa is to become effective. In the example illustrated in FIG. 1, this student's visa becomes effective on Jun. 1, 2018 (which is several years in future).

On completion of data entry in screen 110, the user uses their mouse to click on the "OK" button, thereby instructing computer 120 to save the visa information for this student. In response to the mouse click, computer 120 generates an initial version 121 of an outgoing message which contains a description of this student. Note that initial version 121 is prepared by computer 120 to omit any data that is not currently effective, and in this example, no visa information is included in the initial version 121.

At an appropriate time, computer 120 transmits the initial version 121 of the outgoing message to one or more applications that have expressed a need for such information in the Campus Solutions system. For example, if a first application is designed to accept and process information in real time, then the Campus Solutions system may be configured to provide all messages (including initial version 121) in real time to the first application. And if a second application is designed to accept information only on a specified, schedule (e.g. once a day at midnight), then the Campus Solutions system may be configured to provide all messages to the second application on the specified schedule. Accordingly, an outgoing message (such as initial version 121) can be published synchronously and/or asynchronously, depending on the needs of a target application's subscription to receive such messages.

At an appropriate time, which may be one or more days after initial version 121 of the outgoing message is published, computer 120 is further programmed to automatically prepare one or more additional versions of outgoing messages, to publish previously unpublished data which has newly become effective. In the above-described example, the visa information was omitted from initial version 121 of the outgoing message for being not effective on the date of publication of initial version 121. Accordingly, whenever the event replay process is executed on or after Jun. 1, 2018, visa information that was previously unpublished is used to prepare and publish a new version 122 of the outgoing message.

Therefore in this example, two versions 121 and 122 of the outgoing message are published, respectively without and with the visa information.

Note that a screen for a Campus Solutions system has been described above to aid a conceptual understanding of the invention, although the invention itself is more generally applicable to any application program that provides support for effective dating of data. Specifically, several embodiments of a computer 220 (FIG. 2) in accordance with the invention publish at least two versions 221 and 222 of an outgoing message, without and with data that becomes effective at a specified date in future. Note that a user interface 206 (FIG. 2) of the type illustrated in FIG. 1 and described above, is supported by application program 202. Additionally such information may alternatively be entered in bulk, in a batch mode, via a batch interface 205. The specific manner in which information is entered into application program 202 is not a critical aspect of the invention. Application 202 includes logic 207 to validate the data received via interfaces 205 and 206, and the validated data therefrom is stored in an online database 210 for normal use by application 202. Note that online database 210 may also be used by any other application 215 that supports effective dating. Note further that in some embodiments, database 210 is a relational database which includes several tables of data, each table having several rows and columns. In several such embodiments, the database columns correspond to fields in displays shown to a user by an application program, and the database rows contain entries made by the user in the application program. Furthermore, to distinguish between multiple rows of data within a table, the database has one or more columns whose values uniquely identify each row, and such value are hence referred to as "key values."

In certain embodiments of the type illustrated in FIG. 2, the data being stored in online database 210 is also received in real time by an integration framework (also called "application integration framework") 208 that publishes an initial version 221 of the outgoing message when an incoming message's data is initially input. Integration framework 208 of these embodiments also saves in a data store 209 any data in the incoming message to be published in future, associated with a specified date at which the data becomes effective (i.e. "effective date"). Integration framework 208 also implements a process on a schedule that can be configured, to check if any effective date in data store 209 is less than or equal to a current date in computer 220 and if so publish the unpublished data associated with that effective date (which data has now become effective). In preparing version 222 on the effective date, integration framework 208 uses previously-stored definitions of the outgoing message and also uses data from online database 210, to re-create the outgoing message. After publication of version 222, the formerly unpublished data which has now been published is deleted from data store 209.

Application integration framework 208 of some embodiments is implemented in computer 220 by performing certain acts of a method of the type illustrated in FIG. 3. Specifically, in act 301, computer 220 receives data, in the form of multiple records, to be published to a target application. The target application is incapable of delaying the processing of records associated with an effective date. Accordingly, as per act 302, computer 220 performs a check on whether any record in the received data is associated with an effective date in future. If there is no effective date, or if the effective date is current or past, then computer 220 goes to act 306 to prepare a message without omitting any record, followed by publishing that message as per act 305. In act 302, if an effective date is found to have not yet occurred, i.e. if the effective date is in future, then computer 220 performs an act 303 to save in data store 209 (FIG. 2) all records with future effective dates that are marked as being newly added to database 210. After act 303, computer 220 performs act 304 to prepare an outgoing message by omitting the records which have their effective dates in future (i.e. all the records that were saved to the data store 209), followed by publishing the outgoing message in act 305.

Integration framework 208 of some embodiments is further implemented in computer 220 by performing a process to publish unpublished data from data store 209 at an appropriate time as illustrated by certain acts of a method of the type illustrated in FIG. 4. Specifically, in act 401, computer 220 awakens the process and goes to act 402. The awakening in act 401 can be performed on any schedule, which maybe periodic or aperiodic depending on configuration of integration framework 208. In act 402, computer 220 checks whether any effective date in data store 209 has become current or past, and if not the process goes to sleep until again awakened in act 401. If the result in act 402 is yes, then the computer 220 goes to act 403 and prepares a new version of the outgoing message, based on data in the data store 209 which has been newly made effective by the effective date becoming current or past on awakening in act 401. Note that computer 220 uses message definitions in preparation of the new version of the outgoing message. As per act 404, computer 220 uses a current version of data in the database 210 to the extent necessary to complete the new version of the outgoing message that was created in act 403. Next, in act 405, computer 220 publishes the new version of the outgoing message, followed by act 406 in which the newly published data is deleted from the data store 210. After act 406, the process goes to sleep until again awakened in act 401.

Instead of performing the method of FIG. 3, integration framework 208 of some embodiments is implemented in computer 220 by performing certain acts of a method of the type illustrated in FIG. 5. Specifically, in act 501, computer 220 receives an incoming message of data, in the form of multiple records, to be published to a target application. Next, computer 220 iteratively performs a set of steps in a loop over all records in the message as follows. Specifically, prior to act 502 the computer 220 sets an initial record in the received data as the current record. Then in act 502, computer 220 checks if the current record is a new record with data having an effective date. For example, a record is marked as new if its audit action attribute in PSCAMA is set to the value "A" and the record has an effective date if an attribute "EFFDT" is specified, to have a value in the record. If the result in act 502 is yes, then computer 220 goes to act 503 to check if the effective date is in future and if so goes to act 504. In act 504, computer 220 writes the data from the current record (which is future dated data), into data store 209 and then goes to act 505. In act 505, computer 220 flags the future dated data for omission from the outgoing message, which is soon to be prepared (in act 519 described below), and then goes to act 506. Computer 220 also goes to act 506 if the result of checking in act 503 is no. Computer 220 further goes to act 506 if the result of checking in act 502 is no. Note that the just-described acts 502-506 are illustrated by lines 2-8 of pseudocode shown in FIG. 22.

In act 506, computer 220 checks if the current record is a change record with at least one key value being changed in a row of database 210. For example, a record is marked as changing a key value, if its audit action attribute in PSCAMA is set to the value "N". If the result in act 506 is yes, then computer 220 goes to act 507 to perform an operation illustrated in FIG. 6 (described below), which operation is also called "NK" Processing. Note that a "K" record (any record whose audit action attribute in PSCAMA is set to the value "K") represents the entire contents of the record, before it is updated as shown in the "N" record. To re-state, the "K" record is the before-update value and "N" is the updated version. Hence, the record has before (K) and after (N) snapshots in the incoming message. When there is an N and K record pair present in an incoming message, then the record's key values have been updated.

Referring to FIG. 5, after operation 507, computer 220 goes to act 508 and again checks if the effective date of the current record is in future, and if so goes to act 509. In act 509, computer 220 writes the data from the current record (which is future dated data), into data store 209 and then goes to act 510. In act 510, computer 220 optionally flags the future dated data for omission from the outgoing message, and then goes to act 511.

Note that operation 507, called "NK Processing," determines whether the "N" record should be marked for deletion from the outgoing message—in some embodiments this deletion only occurs under certain conditions, and hence operation 507 is "optional." Specifically, in these embodiments, the "N" record is only deleted from the outgoing message if its effective date (e.g. EFFDT) is in the future (greater than today's date) and the associated "K" record is current dated (less than today's date). These two criteria in combination need to be satisfied in order for the "N" record to be flagged for deletion—this is reason that operation 507 is described as "optional". As noted elsewhere herein, all data flagged for deletion is eventually deleted in act 519, by omission when the outgoing message is prepared.

Computer 220 also goes to act 511 if the result of checking in act 508 is no. Computer 220 further goes to act 511 if the result of checking in act 506 is no. In act 511, computer 220 checks if the current record is a deletion record (e.g. if audit action attribute in PSCAMA is set to the value "D"), or a record containing original values of another record that changes a key value (e.g. if audit action attribute in PSCAMA is set to the value "K"). If the result of act 511 is yes, then computer 220 goes to act 512 to check if the effective date of the current record is in future, and if so goes to act 513. In act 513, computer 220 deletes the future dated data from the data store 509 and goes to act 514. In act 514, computer 220 flags the future dated data for omission from the outgoing message, and then goes to act 515. Computer 220 also goes to act 515 if the result of checking in act 512 is no. Computer 220 further goes to act 515 if the result of checking in act 511 is no.

In act 515, computer 220 checks if the current record changes non-key values in a row of database 210 (e.g. if audit action attribute in PSCAMA is set to the value "C"). If the result of act 515 is yes, then computer 220 goes to act 516 to check if the effective date of the current record is in future, and if so goes to act 517. In act 517, computer 220 flags the future dated data for omission from the outgoing message, and then goes to act 518. Computer 220 also goes to act 518 if the result of checking in act 516 is no. Computer 220 further goes to act 518 if the result of checking in act 515 is no. In act 518, computer 220 checks if all records in the received data have been processed and if not processed then sets the next unprocessed record to be the current record and returns to act 502. If in act 518, all records are found to have been processed, then computer 220 goes to act 519. In act 519, computer 220 prepares the outgoing message, by omitting data which is flagged as described above. Thereafter, the outgoing message is published by computer 220, either in real time or as per a pre-configured schedule of publication to the target application.

Computer 220 enters act 601 (FIG. 6) when implementing the operation 507 (FIG. 5) to perform "NK" processing, which is required to maintain consistency in data store 209, and correctly process changes to a key value associated with an effective date. Note that all acts 601-607 of FIG. 6 are preformed subsequent to receipt of the received data in act 501 and prior to performing a check on whether the effective date is in future, as per act 508. Note further that in entering act 601, the current record in the received message is known to change a key value in a row of the database 210 (e.g. audit action attribute in PSCAMA is set to the value "N").

Referring to FIG. 6, in act 601 computer 220 performs an additional check on specified dates of certain data in data store 209. Specifically, in act 601, computer 220 checks whether a specified date of a current row in data store 209 (the current row corresponds to the current record in the received data) is less than or equal to a current date. In act 601, computer 220 further checks if another specified date of an additional row in data store 209 is greater than the current date, the additional row being checked must be marked as containing original values of the current row (e.g. audit action attribute in the additional row is of value "K"). If the results of both checks in act 601 are true, the current row (e.g. the "N" row) is a new current dated record, whereas the additional row (e.g. the "K" row) is the old future dated record.

Hence, when both checks are true, computer 220 goes to act 602 and changes a mark of the current row to indicate that it is newly added (e.g. the current row's audit action attribute, originally of value "N" is now re-set to the new value "A"). Note that in act 602, only the message record's type is altered from "N" to "A," and there is no change made to the data store 209. The effect of performing act 602 is that the outgoing message to be published in act 519 will contain an addition record (e.g. an "A" record obtained by attribute-changing the "N" row in data store 209). After act 602, computer 220 goes to act 604 via branch 603, without deleting any data from data store 209. The effect of performing act 603 is that the additional row (e.g. the "K" row) which is the old future dated record, remains unchanged, whereby its data will be published in future (e.g. when the "K" row's EFFDT becomes less than or equal to the current date). Note that the just-described acts 601-603 are illustrated by lines 28-30 of pseudocode shown in FIG. 22.

If either of the two checks in act 601 fail, computer 220 goes to act 604 (FIG. 6). In act 604, computer 220 checks whether the specified date of the current row in data store 209 is greater than the current date. In act 604, computer 220 further checks if another specified date of the additional row in data store 209 is less than or equal to the current date. If the results of both checks in act 604 are true, the current record (e.g. the "N" record) is a new future dated record, whereas the additional record (e.g. the "K" record) is the old record.

In act 604 (FIG. 6), when both checks are true, computer 220 goes to act 605 and changes a mark of the current record to indicate that it is deleted in data store 209 (e.g. the current record's audit action attribute, originally of value "K" is now re-set to the new value "D"). The effect of performing act 605 is that an outgoing message to be published in act 519 will now contain a deletion record (e.g. the "D" record obtained by attribute-changing the "K" record). Therefore, act 605 causes a deletion in the target application's data, using information from the K record. After act 605, computer 220 goes to act 606 and deletes a key value change record in data store 209 which holds the original values of the current record (e.g. deletes a "N" record corresponding to the current record). After act 606, computer 220 goes to act 607. Computer 220 also goes to act 607 if either of the two checks in act 604 fail.

In act 607 computer 220 completes operation 507 and thereafter goes to act 508 (described above). Note that the just-described acts 604-607 are illustrated by lines 32-34 of pseudocode shown in FIG. 22.

FIGS. 7-21 illustrate five scenarios (respectively labeled Scenario 1, 2, 3, 4 and 5) that revolve around the update of data within a Campus Solutions system for a prospect. A prospect could be a suspect, a prospective student or a current student. The updates that occur in these scenarios cause the following data changes to be published to other systems: (1) basic prospect information (in an ADM_PRSPCT_CAR parent record) and (2) related Visa Permit information (in an SCC_VISA_PMT_H child record). Each scenario refers to various lines of mentioned in the appendix (via a line number reference). The result for each scenario show a generated XML message's content both before and after integration framework 208 is applied according to the method illustrated in FIGS. 5 and 6.

A current date which is used to construct the five scenarios of FIGS. 7-21 is Feb. 4, 2008. In Scenario 1, the university is informed that details (including Visa Permit details) of an existing prospect (having student identifier AA0025) need to be updated. Hence, a user (who is human) enters information via user interface 206 (FIG. 2) of a Create/Update Prospect Component of the Campus Solutions system to update one or more base details for the prospect as illustrated in FIG. 7. Next, the user adds a new (current dated) Visa Permit for the prospect with EFFDT of Jan. 1, 2008 as illustrated in FIG. 8. Accordingly, a new record is created for the visa information, and this record is processed in integration framework 208, by computer 220 performing acts 502 and 503 (see Lines 2 and 3 in FIG. 22). Note that the visa information is not future dated because the date of Jan. 1, 2008 is in the past (relative to the current date of Feb. 4, 2008). Hence, at this stage an incoming message for the prospect's visa information is published unaltered by computer 220, as the outgoing message. Therefore, the incoming message and the outgoing message of Scenario 1 are both illustrated by FIG. 9.

Specifically, at the end of Scenario 1, a parent record 901 for ADM_PRSPCT_CAR data and a child record 902 for SCC_VISA_PMT_H data are immediately published in an outgoing message which is shown in FIG. 9. Each of records 901 and 902 are published in the outgoing message with their PSCAMA records 904 and 903 respectively, which have audit attributes "C" and "A" respectively. Note that the audit attribute of child record 902 is "A" because new visa permit information is being added, and the attribute of the parent record 901 is "C" because a prospect's existing information is being changed. Also, note that no data of this event is held back in data store 209 which is implemented by an EFFDT Delay table as illustrated in FIG. 11.

The message structure of the XML data which is published in FIG. 9 as displayed in an XML parser is illustrated in FIG. 10. Note that irrelevant details of this message structure are not shown in greater detail so as to clearly illustrate various features of the integration framework used to prepare an outgoing message from an incoming message.

Figure 12:
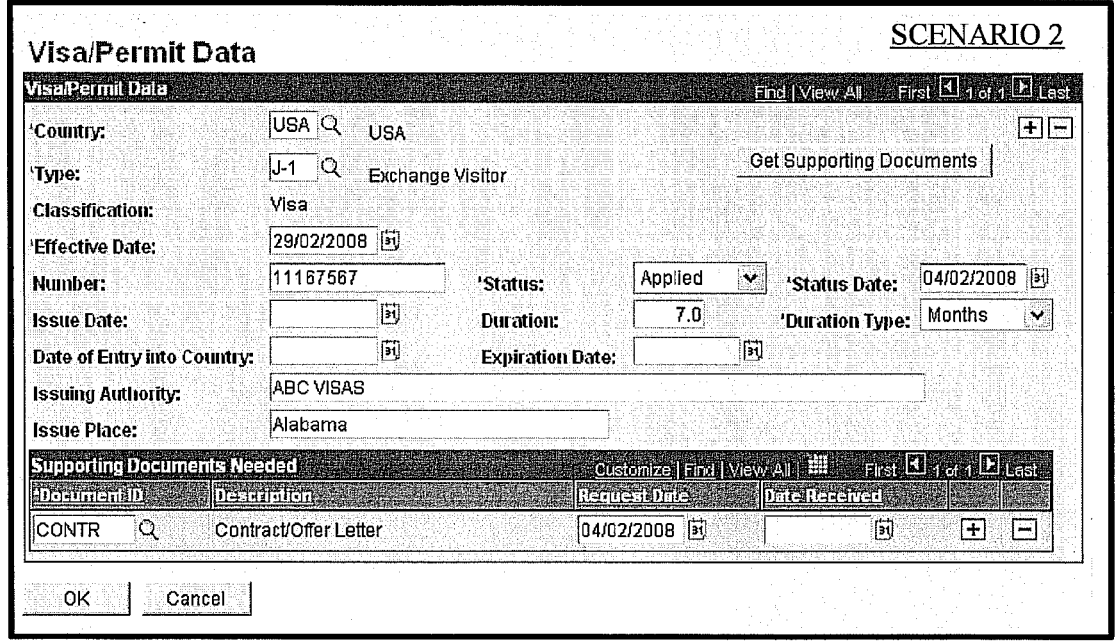
FIG. 12 illustrates the screen of the graphical user interface of FIGS. 7 and 8 receiving additional input from the user in a further example (called "Scenario 2") used to illustrate the invention.

In Scenario 2, which happens after Scenario 1, the prospect notifies the university that certain changes to his/her data are needed and one of the changes is that the sameVisa permit is now not effective until Feb. 29, 2008 which is a date in future (relative to the current date of Feb. 4, 2008). Hence the user enters via user interface 206 (FIG. 2), one or more updates to base details for the prospect (as in Scenario 1) and further updates the Visa Permit's effective date as shown in FIG. 12 to be Feb. 29, 2008. An incoming message to integration framework 208 in response to the user entry of information is illustrated in FIG. 13.

Note that Scenario 2 updates the effective date which is a key value to the existing SCC_VISA_PMT_H Visa data. For this reason, both an 'N' and a 'K' PSCAMA records are initially included in the incoming message. Specifically, the incoming message contains two child records 1301 and 1303 for SCC_VISA_PMT_H data. PSCAMA for a first child record 1301 has an audit action attribute 1302 of value "N" indicating a change in key value for the visa permit information (because the effective date is a key value). Similarly, PSCAMA for a second child record 1303 has the audit action attribute 1304 of value "K" indicating original values of the visa permit information which are being changed by the record 1301.

In responding to the user input in Scenario 2, an outgoing message is created in integration framework 208 to delete the previously published visa information, by computer 220 performing acts 506 and 507 of FIG. 5 (see Lines 8 and 9 in FIG. 22) and acts 604-606 of FIG. 6 (see Lines 32-34 in FIG. 22). More specifically, during NK processing, the 'K' record is changed to be a 'D' record (e.g. previous published data for Jan. 1, 2008 is now identified as being deleted), and the 'N' record is deleted from the EFFDT Delay table, if necessary. Note that as per act 508 of FIG. 5 (see Line 10 of FIG. 22), the visa permit does not become effective until the future date Feb. 29, 2008. Hence, act 509 of FIG. 5 (see Line 11 of FIG. 22) is performed, whereby visa permit information is held back and stored in the EFFDT delay table as illustrated in FIG. 15. Accordingly, as per act 519 of FIG. 5 (see line 27) is performed wherein the prospect's core ADM_PRSPCT_CAR data is eligible to be published immediately and is published as illustrated in FIG. 14.

As noted above in Scenario 2 (see FIG. 15), a data store 209 is used to temporarily store information about the record being held back, including record name (e.g. RECNAME), effective date (e.g. EFFDT), audit action code (e.g. AUDIT_ACTN), sequence number (e.g. SEQ_NBR), as well as a number of keys (e.g. KEY_CHAR_40_01) which may be needed to re-construct the outgoing message from such held-back data (e.g. temporarily stored information which is to be effective at a future date). For example, one key is the student's identifier in the column KEY_CHAR_40_01. A sequence number in data store 209 is automatically incremented each time a record is stored in the data store 209, to ensure that an existing record is not overwritten inadvertently.

Use of such a data store, to temporarily store information on a record is believed to be not disclosed in all of prior art that is known to the inventor of the current patent application. Use of such a data store provides numerous advantages to various embodiments in accordance with the invention. For example, in some embodiments, the data store provides held-back data at an appropriate time, such as (1) when information of a record with an effective date in future (e.g. a held-back record) is changed at the current time, or (2) to publish a held-back record when the effective date becomes same as the current date.

In Scenario 3, which happens after Scenario 2, the prospect notifies the university that additional changes to his/her data are needed and one of the changes is that he/she has been assigned a new (additional) Visa permit which becomes effective today i.e. Feb. 4, 2008. Hence the user again enters via user interface 206 (FIG. 2), one or more updates to base details for the prospect (as in Scenario 1) as shown in FIG. 16 and then enters a new Visa Permit's information including its effective date as shown in FIG. 17. Accordingly, the Campus Solutions system now holds two visa permits, a new visa with a current effective date of Feb. 4, 2008, and an existing visa with a future effective date of Feb. 29, 2008.

In responding to the user input in Scenario 3, an incoming message is supplied to integration framework 208 to add the new visa permit information. Specifically, computer 220 performs acts 502 and 503 of FIG. 5 and finds that the prospect's core ADM_PRSPCT_CAR data is eligible to be published immediately and the new Visa Permit information which is current at todays date of Feb. 4, 2008 is also eligible to be published immediately. Accordingly, since these are the only two records in the incoming message, computer 220 publishes this same message unaltered as the outgoing message as illustrated in FIG. 18. In FIG. 18, the new visa permit's information is shown in record 1801, which is identified by PSCAMA attribute 1802 to be an addition. At this stage, as shown in FIG. 19, data store 209 implemented by an EFFDT delay table continues to hold information on the visa with future effective date of Feb. 29, 2008.

Scenarios 4 and 5 are used to illustrate a process which automatically publishes previously unpublished data when the associated effective date becomes current. As noted above, the visa with future effective date of Feb. 29, 2008 will not become effective until 25 days from now, because the current date is Feb. 4, 2008. Accordingly, in Scenario 4, the passing of date/time is simulated manually as illustrated in FIG. 20 by a direct update of the EFFDT Delay table to make the data effective as of yesterday (Feb. 3, 2008), in order to demonstrate the auto-publish function of integration framework 208. Note that without this manual update as shown in FIG. 20, one would have to wait until the future date Feb. 29, 2008 for this to be demonstrated.

After the direct update, the existing visa data in the EFFDT Delay table becomes eligible for publishing. Once the existing SCC_VISA_PMT_H data stored in the EFFDT Delay table becomes eligible for publishing, it is automatically picked up by an event replay process in integration framework 208. The event replay process in integration framework 208 runs according to a pre-set schedule (e.g. daily), and the schedule may be set up in a configuration screen for this event. Accordingly, -this event replay process identifies the now eligible Visa Permit data in the EFFDT Delay table and proceeds to construct an outgoing message based on the event message definitions, EFFDT Delay table contents and any needed data from online database 210. Then, a complete message as illustrated in FIG. 21 is published by integration framework 208 of computer 220. Computer 220 then deletes from the EFFDT Delay table, visa permit data which has just now been published.

In some embodiments of the invention, the integration framework 208 is prepared in part by a software vendor, such as Oracle Corporation, supplying classes that can be extended by a software engineer. More specifically, in several such embodiments, an engineer first builds an EventNotification subclass as illustrated in FIG. 23 to fire the event from the Prospect Create/Update component page. Next, the engineer registers the new integration in the Integration Framework setup as illustrated in FIG. 24. As shown in FIG. 24, the user activates EFFDT Filtering so that incoming messages are used to automatically generate outgoing messages in real time, depending on which if any records have an associated EFFDT (Effective Date). Moreover, the user activates Event Replay Support—so that the above-described event replay process in integration framework 208 is activated according to a Daily schedule which has been specified by the user. Hence, each day a process executes at the given time to replay any future EFFDT data that has become current. In the example shown in FIG. 24, the data being replayed is divided into packets of ChunkSize (record) size.

The method of FIG. 4 in combination with either the method of FIG. 3 or the method of FIGS. 11 and 6 may be used to program a computer system 220 of the type illustrated in FIG. 25 which is discussed next. Specifically, computer system 220 includes a bus 1102 (FIG. 25) or other communication mechanism for communicating information, and a processor 1105 coupled with bus 1102 for processing information. Computer system 220 also includes a main memory 1106, such as a random access memory (RAM) or other dynamic storage device, coupled to bus 1102 for storing information and instructions to be executed by processor 1105.

Main memory 1106 also may be used for storing temporary variables or other intermediate information during execution of instructions to be executed by processor 1105. Computer system 220 further includes a read only memory (ROM) 1108 or other static storage device coupled to bus 1102 for storing static information and instructions for processor 1105. A storage device 1110, such as a magnetic disk or optical disk, is provided and coupled to bus 1102 for storing information and instructions.

Computer system 220 may be coupled via bus 1102 to a display 1112, such as a cathode ray tube (CRT), for displaying information to a computer user. An input device 1114, including alphanumeric and other keys (e.g. of a keyboard), is coupled to bus 1102 for communicating information and command selections to processor 1105. Another type of user input device is cursor control 1116, such as a mouse, a trackball, or cursor direction keys for communicating direction information and command selections to processor 1105 and for controlling cursor movement on display 1112. This input device typically has two degrees of freedom in two axes, a first axis (e.g., x) and a second axis (e.g., y), that allows the device to specify positions in a plane.

As described elsewhere herein, integration is performed by computer system 220 in response to processor 1105 executing one or more sequences of one or more instructions contained in main memory 1106. Such instructions may be read into main memory 1106 from another computer-readable storage medium, such as storage device 1110. Execution of the sequences of instructions contained in main memory 1106 causes processor 1105 to perform the process steps described herein and illustrated in FIGS. 3 and 4. In alternative embodiments, hard-wired circuitry may be used in place of or in combination with software instructions to implement the invention. Thus, embodiments of the invention are not limited to any specific combination of hardware circuitry and software.

The term "computer-readable storage medium" as used herein refers to any storage medium that participates in providing instructions to processor 1105 for execution. Such a storage medium may take many forms, including but not limited to (1) non-volatile storage media, and (2) volatile storage media. Common forms of non-volatile storage media include, for example, a floppy disk, a flexible disk, hard disk, optical disk, magnetic disk, magnetic tape, or any other magnetic medium, a CD-ROM, any other optical medium, punch cards, paper tape, any other physical medium with patterns of holes, a PROM, and EPROM, a FLASH-EPROM, any other memory chip or cartridge that can be used as storage device 1110. Volatile storage media includes dynamic memory, such as main memory 1106 which may be implemented in the form of a random access memory or RAM.

Transmission media may also be used to provide instructions to processor 1105. Transmission media includes coaxial cables, copper wire and fiber optics, including the wires that comprise bus 1102. Transmission media can also take the form of acoustic or light waves, such as those generated during radio-wave and infra-red data communications, any of which can be used to implement a carrier wave as described herein.

Accordingly, a medium used to provide instructions to processor 1105 can be any transmission medium or storage medium from which a computer can read information, such as data and/or code. Specifically, various forms of media may be involved in carrying one or more sequences of one or more instructions to processor 1105 for execution. For example, the instructions may initially be in a storage device, such as a magnetic disk, of a remote computer. The remote computer can load the instructions into its dynamic memory (RAM) and send the instructions over a telephone line using a modem. A modem local to computer system 220 can receive the information on the telephone line and use an infra-red transmitter to transmit the information in an infra-red signal. An infra-red detector can receive the information carried in the infra-red signal and appropriate circuitry can place the information on bus 1102. Bus 1102 carries the information to main memory 1106, from which processor 1105 retrieves and executes the instructions. The instructions received by main memory 1106 may optionally be stored on storage device 1110 either before or after execution by processor 1105.

Computer system 220 also includes a communication interface 1115 coupled to bus 1102. Communication interface 1115 provides a two-way data communication coupling to a network link 1120 that is connected to a local network 1122. Local network 1122 may interconnect multiple computers (as described above). For example, communication interface 1115 may be an integrated services digital network (ISDN) card or a modem to provide a data communication connection to a corresponding type of telephone line. As another example, communication interface 1115 may be a local area network (LAN) card to provide a data communication connection to a compatible LAN. Wireless links may also be implemented. In any such implementation, communication interface 1115 sends and receives electrical, electromagnetic or optical signals that carry digital data streams representing various types of information.

Network link 1120 typically provides data communication through one or more networks to other data devices. For example, network link 1120 may provide a connection through local network 1122 to a host computer 1125 or to data equipment operated by an Internet Service Provider (ISP) 1126. ISP 1126 in turn provides data communication services through the world wide packet data communication network 1124 now commonly referred to as the "Internet". Local network 1122 and network 1124 both use electrical, electromagnetic or optical signals that carry digital data streams. The signals through the various networks and the signals on network link 1120 and through communication interface 1115, which carry the digital data to and from computer system 220, are exemplary forms of carrier waves transporting the information.

Computer system 220 can send messages and receive data, including program code, through the network(s), network link 1120 and communication interface 1115. In the Internet example, a server 1100 might transmit a mission (which is part of a transportation plan) through Internet 1124, ISP 1126, local network 1122 and communication interface 1115.

The instructions for performing the methods of FIGS. 4 and 3 may be executed by processor 1105 as they are received, and/or stored in storage device 1110, or other non-volatile storage for later execution. In this manner, computer system 220 may obtain the just-described instructions and any related data in the form of a carrier wave.

Figure 25:
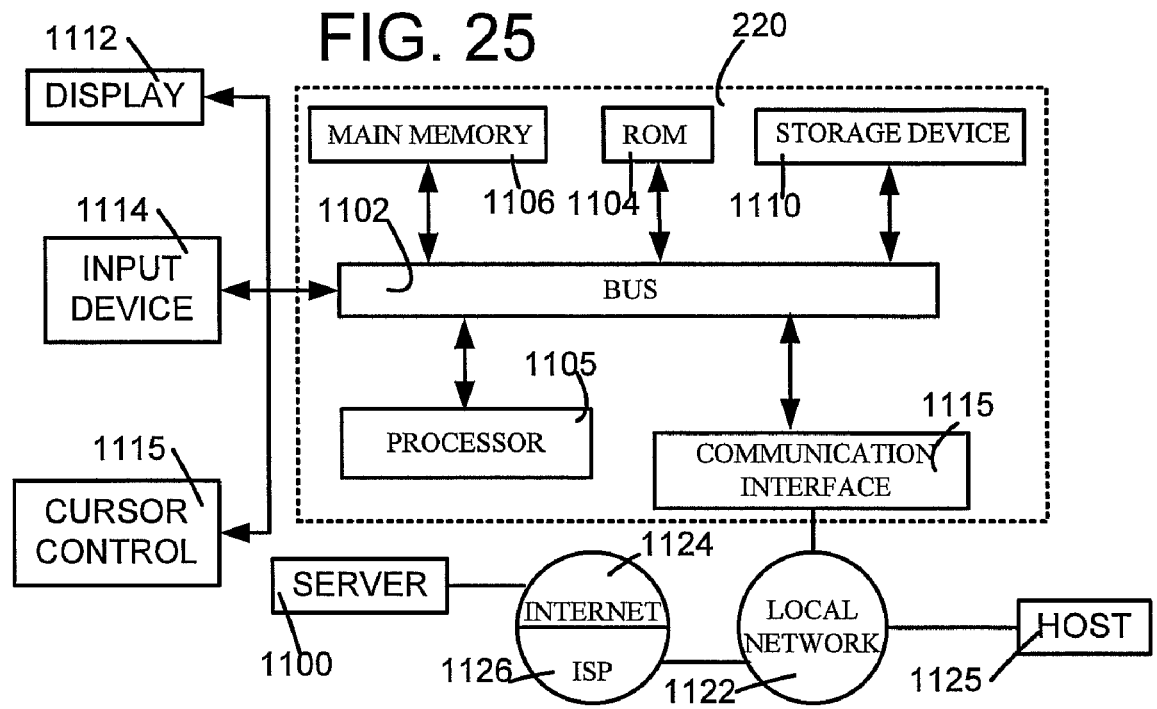
FIGS. 25 and 26 illustrate, in block diagrams, hardware and software portions of a computer that performs the method illustrated in FIGS. 3 and 4.
Figure 26:
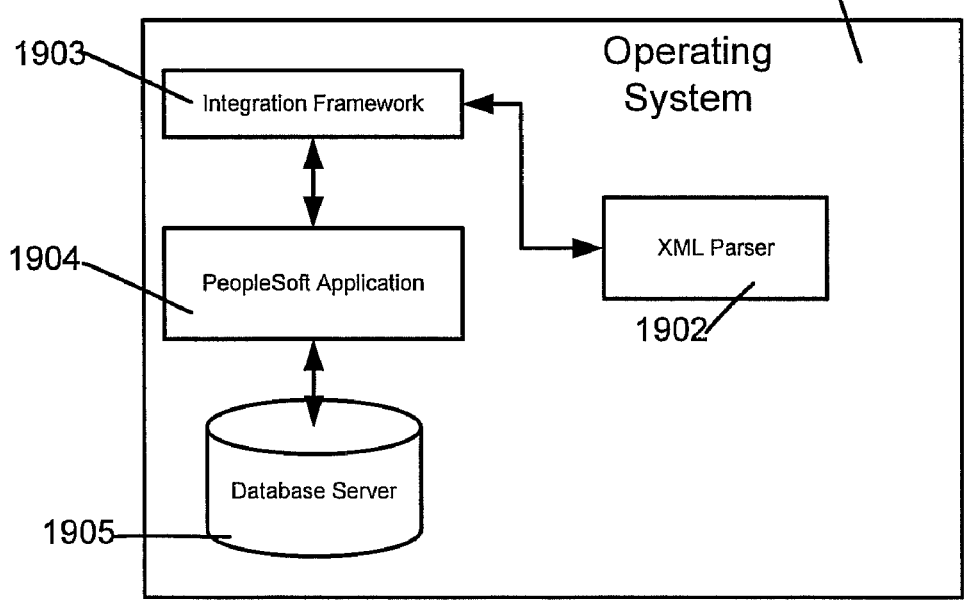

Note that FIG. 25 is a very low-level representation of many hardware components of a computer system. Several embodiments have one or more additional software components in main memory 1106 as shown in FIG. 26: Operating System 1901 (e.g. MICROSOFT WINDOWS 2000), Database Server 1905, PEOPLESOFT application software 1904 (e.g. Campus Solutions available from Oracle Corporation), an Integration Framework 1903 (prepared as described herein), and an XMLParser 1902 (e.g. xmlparser available from Oracle Corporation).

Certain embodiments in accordance with the invention are used to implement a framework in the Campus Solutions application program, a PEOPLESOFT application available from Oracle Corporation. In such embodiments, the framework supports application level integration configuration, allowing easier, faster adaption to integration requirements—dynamic integrations, which can be enabled/disabled online at the application level. Such embodiments further support the PEOPLESOFT feature of Effective dating out-of-the-box. In other words, engineers developing PEOPLESOFT application programs do not need to be concerned that other application programs (e.g. from SAP AG, Microsoft Corporation, BEA Systems, Inc., Oracle Corporation) do not support the feature of Effective Dated data, because an application integration framework of such embodiments handles this data internally. Specifically, future dated data is accrued by the framework internally in a data store, and replayed at a specified future date when that data does become effective.

Several embodiments also support the capture of data updates which are generated by existing legacy batch processes (or which there are typically many). The framework defines technical patterns where-by legacy processes can be updated to capture data updates they may to the database, these data changes can then be accrued and later replayed by the framework.

Certain embodiment support flexible scheduling and replay of captured data updates according to a schedule. Both realtime and batch generated data updates can be captured and replayed according to the requirements of the business area. Further, the replay of data changes for an integration can be scheduled to work around integration partner known outages or batch windows.

Some embodiments support a modular approach to integration development, where a number of integration modules can be separately licensed and regulated easily as an "integration pack". The ability to administer a group of integrations at a higher level in order to support both licensing requirements and ease administration difficulties with a large number of individual integration points.

In some embodiments, an outgoing message of the type shown in FIG. 18 is stored in a memory 1106 (FIG. 25) of a computer 220 that prepares the outgoing message, and this memory 1106 also holds an incoming message from which the outgoing message is prepared. In such embodiments, computer 220 also includes a non-volatile memory e.g. in storage device 1110, in which is implemented a data store 209 (FIG. 2) to hold for publication in future, effective-dated data from the incoming message which is being omitted from the outgoing message. In one such embodiment, the just-described data store 209 in storage device 1110 may be implemented as a table in an online database 210 (FIG. 2) via a database server 1905, and accessed via a relational database management system (of the type available from Oracle Corporation) that is also used to access other tables of information for an application program in the computer.

Numerous modifications and adaptations of the embodiments described herein will become apparent to the skilled artisan in view of this disclosure.

For example, in some embodiments, an "O" record is generated as an option, but it has no significance to the building of (i.e. creation on an outgoing message to be published to a target application as described above.

Note that in some embodiments, messages (incoming and outgoing) conform to the following definition of a PSCAMA record to identify properties or attributes of a preceding record in the message:

| | |
|---|---|
| LANGUAGE_CD | Indicates the language in which the message is generated, so the receiving application can take that information into account when processing the message. When sending a message with component PeopleCode, the system sets this field to the user's default language code. |
| AUDIT_ACTN | Identifies each row of data as an Add, Change, or Delete action. |
| BASE_LANGUAGE_CD | (Optional.) Indicates the base language of the sending database. This is used by generic, full-table subscription PeopleCode to help determine which tables to update. |
| MSG_SEQ_FLG | (Optional.) Supports the transmission of large transactions that may span multiple messages. Indicates whether the message is a header (H) or trailer (T) or contains data (blank). The header and trailer messages don't contain message data. The receiving system can use this information to determine the start and end of the set of messages and initiate processes accordingly. For example, the header message might cause staging tables to be cleared, while the trailer might indicate that all of the data has been received and an update job should be initiated. |
| PROCESS_INSTANCE | (Optional.) Process instance of the batch job that created the message. Along with the sending node and publication ID, the receiving node can use this to identify a group of messages from the sending node. |
| PUBLISH_RULE_ID | (Optional.) Indicates the publish rule that is invoked to create the message. This is used by routing PeopleCode to locate the appropriate chunking rule, which then determines to which nodes the message should be sent. Third-party applications can ignore this field. |
| MSGNODENAME | (Optional.) The node to which the message should be sent. This field is passed to the Publish utility by the Application Engine program. Routing PeopleCode must look for a value in this field and return that value to the application server. Third-party applications can ignore this field. |

Note further that such embodiments use the following definition for the Audit Action Code ("AUDIT_ACTN") in the PSCAMA record:

| Audit Action Code | Description |
|---|---|
| A | Add a noneffective or effective-dated row. To add an effective-dated row, the value is A. If you populate the row data by using the CopyRowsetDeltaOriginal method in the PeopleCode Message class, an additional record is created with an audit action value of O, containing the original values of the current effective-dated row. |
| C | Change non-key values in a row. |
| D | Delete a row |
| K | If you change at least one key value in a row (in addition to any non-key values) and then populate the row data by using the CopyRowsetDeltaOriginal or CopyRowsetDelta methods in the Message class, an additional record is created with an audit action value of K, containing the original values of the current effective-dated row. |
| N | Change at least one key value in a row (in addition to any non-key values). |
| O | If you change non-key values in a row and populate the row data by using the CopyRowsetDeltaOriginal method in the Message class, an additional record is created with an audit action value of O, containing the original values of the current effective-dated row. |
| Blank | Default value. If a row's content hasn't changed, the value is blank. This audit action code is also used to tag the parents of rows that have changed. |

Numerous modifications and adaptations of the embodiments described herein are encompassed by the scope of the invention.

What is claimed is:

1. A non-transitory computer-readable storage medium comprising a plurality of instructions to cause a computer to:
receive data comprising a plurality of records to be published to an application;
wherein said application is incapable of delaying processing of a current record in the plurality of records, based on the current record being identified as not effective until a specified date in future;
perform a first check on whether the received data comprises the current record identified as not effective until the specified date in future and on finding that said current record is identified as not effective: (a) omit said current record while using at least a portion of said received data to prepare an outgoing message and (b) in an event that said current record is identified in the received data as being newly added to an online database, save the specified date and data from said current record in a data store of data to be published in future;
publish the outgoing message;
subsequent to publication of the outgoing message, and automatically in response to any date in the data store becoming current or past: (c) prepare a new version of the outgoing message, based on data in the data store made effective by said any date becoming current or past, and further based on a current version of the received data effective on said any date and (d) delete the data in the data store made effective by said any date becoming current;
publish the new version of the outgoing message;
subsequent to receipt of the received data, perform a second check comprising at least whether the specified date of the current record is less than or equal to a current date within said computer; and on finding at least a result of performing the second check to be true, at least identify said current record as being newly added to the online database.

2. The non-transitory computer-readable storage medium of claim 1 wherein:
the second check further comprises at least whether another specified date of another record is greater than the current date.

3. The non-transitory computer-readable storage medium of claim 1 further comprising instructions to cause said computer to:
on finding the result of said second check to be false, perform a third check on whether another record is marked as containing original values of said current record with at least one key value therein being changed by the current record and if the specified date of the current record is greater than the current date and if another specified date of said another record is less than or equal to the current date; and
on finding a result of said third check to be true, changing a mark of said another record to being deleted, and deleting said current record from the data store.

4. The non-transitory computer-readable storage medium of claim 1 further comprising instructions to cause said computer to:
delete data of the current record in the data store if the current record in the received data is identified as not effective until the specified date and if the current record is identified as being deleted from the online database.

5. The non-transitory computer-readable storage medium of claim 1 further comprising instructions to cause said computer to:
delete data of the current record in the data store if the current record in the received data is identified as not effective until the specified date and if the current record is identified as containing original values of a record in the online database with at least one key value therein being changed by another record in the received data.

6. The non-transitory computer-readable storage medium of claim 1 further comprising instructions to cause said computer to:
flag the current record for omission prior to performing said first check on another record;
wherein said preparation of the outgoing message is performed after performance of said first check on all records in said plurality of records.

7. The non-transitory computer-readable storage medium of claim 1 wherein:
at least a group of said instructions are comprised in a plurality of classes; and
the computer-readable storage medium further comprises instructions to be executed in addition to execution of said group, to cause said computer to:
receive from a software developer, additional instructions to perform a plurality of methods; and
in response to receipt of the additional instructions, automatically perform the plurality of methods instead of performing the corresponding methods in executing said plurality of classes.

8. The non-transitory computer-readable storage medium of claim 1 wherein said instructions to cause said computer to:
perform the second check prior to the first check.

9. A computer comprising a processor and a memory coupled to the processor, the memory comprising instructions to:
receive data comprising a plurality of records to be published to an application;
wherein said application is incapable of delaying processing of a current record in the plurality of records, based on the current record being identified as not effective until a specified date in future;
perform a first check on whether the received data comprises the current record identified as not effective until the specified date in future and on finding that said current record is identified as not effective: (a) omit said current record while using at least a portion of said received data to prepare an outgoing message and (b) in an event that said current record is identified in the received data as being newly added to an online database, save the specified date and data from said current record in a data store of data to be published in future;
publish the outgoing message;
subsequent to publication of the outgoing message, and automatically in response to any date in the data store becoming current: (c) prepare a new version of the outgoing message, based on data in the data store made effective by said any date becoming current, and further based on a current version of the received data effective on said any date and (d) delete the data in the data store made effective by said any date becoming current;
publish the new version of the outgoing message;
subsequent to receipt of the received data, perform a second check comprising at least whether the specified date of the current record is less than or equal to a current date within said computer; and
on finding at least a result of performing the second check to be true, at least identify said current record as being newly added to the online database.

10. The computer of claim 9 wherein:
the memory further comprises an incoming message comprising said plurality of records;
the memory further comprises said outgoing message omitting said current record; and
said data store comprises a table in said online database.

11. The computer of claim 9 wherein:
the second check further comprises at least whether another specified date of another record is greater than the current date.

12. The computer of claim 9 wherein the memory further comprises instructions to:
delete data of the current record in the data store on finding that at least a predetermined condition is met.

13. The computer of claim 9 wherein the memory further comprises instructions to:
flag the current record for omission prior to performing said first check on another record.

14. The computer of claim 9 wherein:
said preparation of the outgoing message is performed after performance of said first check on all records in said plurality of records.

15. An apparatus for publishing information to an application, the apparatus comprising:
means for receiving data comprising a plurality of records to be published to the application;
wherein said application is incapable of delaying processing of a current record in the plurality of records, based on the current record being identified as not effective until a specified date in future;
means for performing a first check on whether the received data comprises the current record identified as not effective until the specified date in future and on finding that said current record is identified as not effective: (a) omit said current record while using at least a portion of said received data to prepare an outgoing message and (b) in an event that said current record is identified in the received data as being newly added to an online database, save the specified date and data from said current record in a data store of data to be published in future;

means, coupled to said means for performing, for publishing the outgoing message;

means, responsive to any date in the data store becoming current, to (c) prepare a new version of the outgoing message, based on data in the data store made effective by said any date becoming current, and further based on a current version of the received data effective on said any date and (d) delete the data in the data store made effective by said any date becoming current;

means to invoke the means for publishing, with the new version of the outgoing message;

means for performing a second check subsequent to receipt of the received data, by checking at least whether the specified date of the current record is less than or equal to a current date within said computer; and means, responsive to finding at least a result of performing the second check to be true, for at least identifying said current record as being newly added to the online database.

16. The apparatus of claim 15 wherein:
the second check further comprises at least whether another specified date of another record is greater than the current date.

17. The apparatus of claim 15 further comprising:
means for deleting data of the current record in the data store on finding that at least a predetermined condition is met.

18. The apparatus of claim 15 further comprising:
means for flagging the current record for omission prior to performing said first check on another record.

19. A computer-implemented method for publishing information to an application, the method comprising:
receiving data comprising a plurality of records to be published to the application;
wherein said application is incapable of delaying processing of a current record in the plurality of records, based on the current record being identified as not effective until a specified date in future;
performing a first check on whether the received data comprises the current record identified as not effective until the specified date in future and on finding that said current record is identified as not effective: (a) omit said current record while using at least a portion of said received data to prepare an outgoing message and (b) in an event that said current record is identified in the received data as being newly added to an online database, saving the specified date and data from said current record in a data store of data to be published in future;
publishing the outgoing message;
subsequent to transmission of the outgoing message, and automatically in response to any date in the data store becoming current: (c) preparing a new version of the outgoing message, based on data in the data store made effective by said any date becoming current, and further based on a current version of the received data effective on said any date and (d) deleting the data in the data store made effective by said any date becoming current; and
publishing the new version of the outgoing message;
subsequent to receipt of the received data, performing a second check comprising at least whether the specified date of the current record is less than or equal to a current date within said computer; and
on finding at least a result of performing the second check to be true, at least identifying said current record as being newly added to the online database.

20. The computer-implemented method of claim 19 wherein:
the second check is performed prior to performing said first check;
the second check further comprises checking if another specified date of another record is greater than the current date; and
said another record is identified as containing original values of the current record with at least one key value therein being changed by the current record.

21. The computer-implemented method of claim 19 further comprising:
if the result of said second check is false, performing a third check on whether said another record is marked as containing original values of said current record with at least one key value therein being changed by the current record and if the specified date of the current record is greater than the current date and if said another specified date of said another record is less than or equal to the current date; and
if a result of said third check is true, changing another mark of said another record to being deleted, and deleting said current record from the data store.

22. The computer-implemented method of claim 19 wherein:
the second check further comprises at least whether another specified date of another record is greater than the current date.

23. The computer-implemented method of claim 19 further comprising:
deleting data of the current record in the data store on finding that at least a predetermined condition is met.

24. The computer-implemented method of claim 19 further comprising:
flagging the current record for omission prior to performing said first check on another record.

25. The computer-implemented method of claim 19 wherein:
said preparation of the outgoing message is performed after performance of said first check on all records in said plurality of records.

26. The computer-implemented method of claim 19 wherein:
the second check is performed prior to the first check.

* * * * *

UNITED STATES PATENT AND TRADEMARK OFFICE
CERTIFICATE OF CORRECTION

| | | |
|---|---|---|
| PATENT NO. | : 7,966,297 B2 | Page 1 of 1 |
| APPLICATION NO. | : 12/041464 | |
| DATED | : June 21, 2011 | |
| INVENTOR(S) | : Guilbert | |

It is certified that error appears in the above-identified patent and that said Letters Patent is hereby corrected as shown below:

In column 4, line 48, delete "specified," and insert -- specified --, therefor.

In column 11, line 37, delete "-this" and insert -- this --, therefor.

In column 14, line 62, delete "creation on" and insert -- creation of) --, therefor.

Signed and Sealed this
First Day of November, 2011

David J. Kappos
*Director of the United States Patent and Trademark Office*